(12) United States Patent
Takeuchi

(10) Patent No.: US 7,141,230 B2
(45) Date of Patent: Nov. 28, 2006

(54) METHOD OF REMOVING RESIDUAL ACTIVE OXY-HYDROGENS

(75) Inventor: Makoto Takeuchi, Tokyo (JP)

(73) Assignee: Advanced Capacitor Technologies, Inc., Tokyo (JP)

( * ) Notice: Subject to any disclaimer, the term of this patent is extended or adjusted under 35 U.S.C. 154(b) by 690 days.

(21) Appl. No.: 10/165,211

(22) Filed: Jun. 6, 2002

(65) Prior Publication Data

US 2003/0228250 A1  Dec. 11, 2003

(30) Foreign Application Priority Data

Jun. 6, 2001  (JP) .............................. 2001-171522

(51) Int. Cl.
*H01G 9/058* (2006.01)
*C01B 31/02* (2006.01)

(52) U.S. Cl. .................. 423/460; 502/438; 429/231.8; 423/445 R

(58) Field of Classification Search ................ 423/460, 423/461; 502/53, 416, 438, 515; 429/231.8
See application file for complete search history.

(56) References Cited

U.S. PATENT DOCUMENTS

| | | | | |
|---|---|---|---|---|
| 2,721,184 | A | * | 10/1955 | Voorhies, Jr. ............... 502/432 |
| 3,964,933 | A | * | 6/1976 | Fung et al. ............... 429/231.8 |
| 4,142,949 | A | * | 3/1979 | Faul et al. ................... 205/468 |
| 4,404,118 | A | * | 9/1983 | Herskovits ................... 502/53 |
| 4,624,937 | A | * | 11/1986 | Chou ........................ 502/180 |
| 4,978,650 | A | * | 12/1990 | Coughlin et al. ........... 502/432 |
| 5,242,879 | A | * | 9/1993 | Abe et al. ................... 502/180 |
| 5,460,759 | A | * | 10/1995 | Dubots ....................... 264/29.7 |
| 5,488,023 | A | * | 1/1996 | Gadkaree et al. ........... 502/182 |
| 6,514,907 | B1 | * | 2/2003 | Tsutsumi et al. ........... 502/417 |
| 2002/0039275 | A1 | | 4/2002 | Katsumi et al. | |

FOREIGN PATENT DOCUMENTS

| EP | 0 861 804 A | 9/1998 |
|---|---|---|
| EP | 0 890 963 A | 1/1999 |
| EP | 1 115 130 A | 7/2001 |
| WO | WO 00/11688 A | 3/2000 |

OTHER PUBLICATIONS

"Evaluation of Activated Carbon Electrodes for Electric Double Layer Capacitors Using an Organic Electrolyte Solution" of Kazuya Hiratsuka et al., *Denki Kagaku*, vol. 59, No. 7, pp. 607-613 (1991).
"Electrochemical Intercalation of Tetraethylammonium Tetrafluoroborate into KOH-Treated Carbon Consisting of Multi-Graphene Sheets for an Electric Double Layer Capacitor". Makoto Takeuchi et al., *Denki Kagaku*, vol. 66, No. 12, pp. 1311-1317 (1998).
*Carbon Black Handbook* (in Japanese), New Edition, p. 11, Fig. 9, Volatile Composition of Carbon Black.
Japanese Patent Application No. 2000-201849 (Laying-Open No. 2002-025867). filed Jul. 4, 2000, with English-Language Abstract.
Abstract of "D. Dehydration Reaction", *Activated Carbon, Fundamentals and Applications*, New Edition (in Japanese). pp. 162-164 (1995).
"Reverse Spillover of Hydrogen on Carbon and Its Participation in Catalytic Dehydrogenation", K. Fujimoto et al., *Proceeding of the 7th International Congress on Catalysis*. Tokyo (1980), pp. 235-246.
"Non-porous Carbon for a High Energy Density Electric Double Layer Capacitor". Makoto Takeuchi et al., *Electrochemistry*, vol. 69, No. 6 (2001), pp. 487-492.

* cited by examiner

*Primary Examiner*—Wayne Langel
*Assistant Examiner*—Alvin T Raetzsch
(74) *Attorney, Agent, or Firm*—The Webb Law Firm

(57) ABSTRACT

A method of efficiently removing active oxy-hydrogens (e.g., existing as hetero element-containing functional groups such as COOH, CHO, and OH) present in a carbon material at a relative low temperature. The invention also provides a carbon-activating material adapted for use in a polarizable electrode typically used in an electrical double-layer capacitor. The method of removing residual active oxy-hydrogens in the carbon material starts with mixing the carbon material and a transition metal or a transition metal compound. The resulting mixture is thermally processed within a stream of a reducing gas. Preferably, the transition metal or transition metal compound is removed from the thermally processed mixture.

11 Claims, 20 Drawing Sheets

METHOD OF REMOVING RESIDUAL ACTIVE OXY-HYDROGENS

BACKGROUND OF THE INVENTION

1. Field of the Invention

The present invention relates to a carbon material used as an activating material in the negative electrode of a lithium-ion secondary battery or in a polarizable electrode in an electrical double-layer capacitor. More particularly, the invention relates to a method of efficiently removing electrochemically active oxy-hydrogens (hydrogen atoms bonded to oxygen atoms in the natural state, e.g., hydrogen atoms existing as hetero element-containing functional groups, such as COOH, CHO, and phenolic OH) at a relatively low temperature. Where an electrode is fabricated from such a carbon material, the aforementioned electrochemically active oxy-hydrogens are one of the causes of inability to achieve a high-voltage operation, and are present on the surface of the carbon material or within micropores.

2. Description of Related Art

In an electrical double-layer capacitor, a pair of polarizable electrodes is placed opposite to each other within an electrolyte solution via a separator to form positive and negative electrodes. The capacitor operates on the principle that electric charge is stored in an electrical double-layer capacitor formed at the interface between each polarizable electrode and the electrolyte solution. Therefore, it is considered that the capacity of an electrical double-layer capacitor is roughly proportional to the surface area of the polarizable electrode. Hence, porous carbon and activated carbon having specific surface areas of 1,000 to 2,000 $m^2/g$, as measured using the BET method, have been often used as activating materials for polarizable electrodes (for example, Hiratsuka Kazuya et al., *DENKI KAGAKU,* Vol. 59, No. 7, pp. 607–613 (1991)).

On the other hand, a nonporous carbon having only a specific surface area of less than 100 $m^2/g$ has been proposed (M. Takeuchi et al., *DENKI KAGAKU,* Vol. 66, No. 12, pp. 1311–1317 (1998)). In all of these carbon materials including porous carbon, activated carbon, and nonporous carbon, activation leaves a large number of functional groups on carbon surfaces. Where a polarizable electrode is made of such a carbon material, if an organic solvent-based electrolyte solution is used, and if a voltage of higher than 2.5 V is applied between the opposite electrodes, functional groups (especially, hetero element-containing functional groups) left on the carbon electrode surface react with the electrolyte solution, producing gas or forming an electrically nonconducting film. This, in turn, increases the internal resistance, causing a malfunction, reducing the service life, or producing other problems. High-temperature processing under vacuum has been considered as means for removing such residual functional groups with unsatisfactory results.

This high-temperature processing is based on the process in which $H_2O$, COOH, CHO, C=0, and so on are released as $CO_2$, $H_2O$, and CO within an inert gas stream as the temperature rises, as described in the *Carbon Black Handbook* (in Japanese), New Edition, p. 11, FIG. 9, "Composition of Volatile Components of Carbon Black" that is a reference regarding carbon. Release in the form of $H_2$ begins when the temperature exceeds about 800° C. Accordingly, where a heat treatment is made at a temperature between 200° C. and 800° C., some contribution is given to removal of residual functional groups. As the temperature is increased, more kinds of functional groups are released. That is, most hetero element-containing functional groups are once removed at 800° C. However, free radicals are produced on the carbon surface at the same time. The produced free radicals are highly reactive and react with $H_2O$ and $O_2$ within the air quickly or slowly when carbon is taken out into the air. As a result, electrochemically active oxy-hydrogens (e.g., COOH, CHO, and OH) again form. This can be easily confirmed by observing carbon materials, to which water vapor is artificially added, by pulsed NMR spectroscopy (described later).

In view of the foregoing problem, we have proposed a method (Japanese Patent Application No. 2000-201849, filed Jul. 4, 2000) that is an improvement over the aforementioned high-temperature processing in anticipation of terminating produced radical groups with hydrogen. In particular, the produced radical groups are heat-treated within a hydrogen stream or, industrially, within mixture gas $3H_2+N_2$ obtained by decomposing $NH_3$ gas using $Fe_2O_3$ catalyst.

It is reported that the high-temperature processing within this hydrogen stream produces greater effects with increasing the temperature.

However, where the material is used as a polarizable electrode in an electrical double-layer capacitor or the like, nonporous carbon has few micropores in the initial phase, unlike activated carbon. The nonporous carbon forms an electrical double layer by electrochemical intercalation. High capacitance is subsequently maintained by the hysteresis effect. Where the nonporous carbon is post-treated, the interplanar spacing $d_{002}$ of graphite-like layers grown within the carbon structure varies as shown in FIG. 1 by the temperature of the post-heat treatment. In FIG. 1, the value of the interplanar spacing $d_{002}$ obtained by X-ray diffraction (XRD) is plotted on the vertical axis, while the heat treatment temperature is plotted on the horizontal axis. The values of interplanar spacing $d_{002}$ of calcined carbon and KOH-activated carbon, respectively, are indicated around the left end of the horizontal axis. It can be seen from this graph that the interplanar spacing shows a maximum value after KOH activation and that the spacing is reduced by subsequent thermal processing. The general tendency is that the interplanar spacing $d_{002}$ decreases with increasing the temperature. What are plotted indicate the following carbon materials: Indicated by ▼ is nonporous carbon D prepared using petroleum pitch made infusible as raw material carbon. Indicated by ▽ is nonporous carbon A prepared using petroleum-based needle coke as raw material carbon. Indicated by ■ is nonporous carbon C prepared using petroleum-based needle coke as raw material carbon. Indicated by ●, ▲ and □ are nonporous carbons B prepared using petroleum-based needle cokes as raw material carbons under different pretreatment and activation conditions. The interplanar spacing $d_{002}$ tends to decrease with increasing temperature. As the interplanar spacing $d_{002}$ decreases, the intercalation start voltage increases. This reduces the hysteresis effect after initial charging.

The capacitance tends to decrease when the operation is performed at a low voltage (FIG. 2). FIG. 2 shows the results of measurements performed by measuring charging and discharging characteristics while increasing the applied voltage in increments of 0.5 V or 0.25 V until the voltage reached 0.5 to 3.75 V and reducing the voltage similarly in increments until the voltage reached 3.75 to 0.5 V. The measured sample is the nonporous carbon B which was prepared using petroleum-based needle coke as raw material carbon and thermally processing the carbon in a reducing ambient. Symbols, such as "+504H" attached to each sample which have undergone measurements, have the aforementioned meanings. It can be seen from the graph that each sample showed a higher capacitance when the applied voltage was reduced than when the voltage was increased by a hysteresis effect. It is observed that a sample thermally treated at a higher temperature shows a higher rising voltage and a smaller capacitance. This is due to the interplanar spacing $d_{002}$. This gives the designer less latitude in designing the electrical double-layer capacitor. For example, a limitation is placed on the selection of a solvent for an electrolyte solution having a small molar volume.

Where the maximum voltage applied between the electrodes is 3.75 to 4.0 V, if a higher voltage is applied, the internal resistance will increase rapidly. It is highly likely that, if the voltage is subsequently lowered, the internal resistance is not reduced. Therefore, the maximum applied voltage is urged to be set to 3.75 V or 4.0 V. The operating voltage is set to a value (e.g., 2.7 V or 3.5 V) lower than the maximum voltage. As can be seen from FIG. 2, those materials which were processed at lower temperatures, have greater interplanar spacing $d_{002}$, and lower intercalation start voltages, show greater hysteresis effects than those processed at higher temperatures and exhibit greater capacitances at low voltages.

Therefore, it is required that residual functional groups be removed as much as possible at the lowest temperature achievable.

Where a carbon material, such as activated carbon, porous carbon, or nonporous carbon, is thermally treated industrially, if the mixture gas of oxygen within the air and leaking hydrogen gas (or if oxygen leaks into a hydrogen stream from outside) is heated above 550° C., or if the mixture gas catches fire, a so-called explosive reaction of oxygen and hydrogen gases will be induced. Therefore, care must be exercised. Where the process can be performed at a temperature sufficiently lower than 550° C., the safety is enhanced, and no extra equipment cost is required.

SUMMARY OF THE INVENTION

It is an object of the present invention to provide means for removing active oxy-hydrogens in a carbon material for a polarizable carbon electrode including activated carbon, no matter whether porous or nonporous carbon, in other words, residual functional groups (i.e., COOH, CHO, OH, and so on), in the most economical, safety, and complete manner at the lowest temperature achievable of lower than 550° C. to prevent explosive reaction of oxygen and hydrogen gases.

It is another object of the present invention to provide a carbon-activating material adapted for a polarizable electrode typically used in an electrical double-layer capacitor.

In an electrical double-layer capacitor using a nonaqueous electrolyte solution, activated carbon (including porous and nonporous carbon) used as a material for activating the polarizable electrodes leaves a large number of hetero element-containing functional groups, such as COOH, CHO, and phenolic OH, on its surface due to activating processing. If electrodes are fabricated from such activated carbon or nonporous carbon and the capacitor is operated at an interelectrode voltage of higher than 2.5 V, the electrolyte solution electrochemically reacts with these hetero element-containing functional groups. Therefore, it is necessary to remove these hetero element-containing functional groups present in the activated porous or nonporous carbon.

One of the methods for removing them consists of heating the carbon within a reducing gas stream at 500° C.-800° C. In thermal processing within a stream of hydrogen gas that is a reducing gas, the number of kinds of released functional groups increases with increasing the temperature, and the functional groups can be more effectively removed. In the case of activated carbon, this processing at such a high temperature presents no problem. However, in the case of nonporous carbons having graphite-like crystallites of carbon and small specific surface areas, it has been observed that high-temperature processing reduces the interplanar spacing $d_{002}$ in the crystallites of carbon.

We have found that the processing temperature can be reduced by using a transition metal during the aforementioned processing within a reducing gas stream. Furthermore, we have discovered that carbon surface structure can be analyzed by pulsed NMR spectroscopy and that the amount of hetero element-containing functional groups present in the carbon material can be quantitatively evaluated from the amounts of presence of a short relaxation time component $T2=10$ to $50$ μsec (Gaussian type) and a moderate relaxation time component $T2=55$ to $400$ μsec (Lorentzian type) by observation of $^1H$ resonance of powdered carbon making use of pulsed NMR. Based on these findings, the present invention has been made.

The present invention lies in a method of removing active oxy-hydrogens (that may be referred to as chemically adsorbed water) which are hydrogen atoms bonded to oxygen atoms left within a carbon material and which exist as the above-described hetero element-containing functional groups. When a voltage is applied, the chemically adsorbed water will react with the electrolyte. The method starts with adding a transition metal or a transition metal compound to the carbon material to be processed. Then, the obtained mixture of the carbon material and transition metal or transition metal compound is heat-treated within a reducing gas stream. As a result of this processing, the hetero element-containing functional groups in carbon material are removed as $H_2O$, $CO_2$, or CO. Consequently, a refined carbon material in which no active oxy-hydrogens are left is obtained. At this time, it is desired to remove the transition metal or transition metal compound from the processed mixture of carbon material and transition metal or transition metal compound. The refined carbon material derived in this way can be used as a material for activating polarizable electrodes in an electrical double-layer capacitor or the like.

No limitations are placed on the processed carbon material. The carbon material may have micropores, such as activated carbon or porous carbon. Alternatively, the carbon material may have no micropores, such as the activated nonporous carbon. To make maximum use of the effect of the present invention (i.e., active oxy-hydrogens can be removed at a relatively low temperature), it is preferable to use the activated nonporous carbon as a carbon material. The processed carbon material may take any form, such as powdered form, granular form, fibrous form, and whisker form.

In one feature of the present invention, a carbon material to be processed and a transition metal or transition metal compound are mixed and heat-treated in a reducing environment, preferably in a reducing gas stream. The reducing gas is hydrogen or a mixture gas ($3H_2+N_2$) of hydrogen and nitrogen, the mixture gas being produced by catalytically decomposing ammonia using a catalyst of $Fe_2O_3$ or the like.

The mixture is only required that the transition metal or transition metal compound be sufficiently dispersed in the carbon material to be processed. The mixing step for achieving this state may be any desired process. Furthermore, the transition metal or transition metal compound dispersed in the carbon material may assume powdered form, fibrous form, form of thin wires, form of chips, or any other form. In addition, a mesh, dendritic, or floccular product may be fabricated using thin wire of a transition metal. This product and a carbon material may be mixed.

To mix the transition metal compound with the carbon material, a solid compound in powdered, granular, fibrous form, or in the form of thin wires or chips themselves may be added to the carbon material and dispersed in it, in the same way as in the case of a transition metal. "Mixing of a carbon material and a transition metal compound" referred to herein can also be accomplished by dissolving such a transition metal compound in water or organic solvent, impregnating the obtained solution in the carbon material, and then evaporating off the water or organic solvent to carry the transition metal compound on the surface of the carbon material.

The present invention also provides a method of producing a refined carbon material from which active oxy-hydrogens have been removed as described above from a carbon material to be processed. This fabrication method starts with: (1) mixing the carbon material with a transition metal or transition metal compound; (2) the obtained mixture of the carbon material and the transition metal or transition metal compound is thermally processed in a reducing gas stream; and (3) then, the transition metal or transition metal compound is removed from the thermally processed mixture. Thus, the refined carbon material from which the active oxy-hydrogens have been removed is obtained.

Furthermore, in the present invention, a short relaxation time component having a lateral relaxation time $T2=17$ to $50$ μsec (Gaussian type) and a moderate relaxation time component having a lateral relaxation time $T2=55$ to $400$ μsec (Lorentzian type) are measured. These are observed by $^1H$ resonance by pulsed NMR spectroscopy and indicate different bonding states of residual hydrogen atoms within the carbon structure. The amount of the active oxy-hydrogens in the refined carbon material obtained as described above is determined from the ratio between these two components. The refined carbon material of the present invention is characterized in that the ratio of the short relaxation time component $T2=17$ to $50$ μsec (Gaussian type) to the moderate relaxation time component $T2=55$ to $400$ μsec (Lorentzian type) is less than one third where these components are found by pulsed NMR spectroscopy as described above. That is, the moderate relaxation time component is quite small. This refined carbon material can be used as a carbon-activating material for polarizable electrodes in an electrical double-layer capacitor. The electrical double-layer capacitor fabricated using the refined carbon material is excellent in that no gas is produced during charging and discharging, the capacity is not attenuated, and the internal resistance is not increased.

Where this refined carbon material is a nonporous carbon, removal of active oxy-hydrogens will not reduce the interplanar spacing $d_{002}$. Consequently, an electrical double-layer capacitor having a large capacity is obtained. The "nonporous carbon" referred to herein means a carbon having graphite-like crystallites of carbon and a small number of micropores (and thus has a small specific surface area), as described in above-cited Japanese Patent Application No. 2000-201849. For example, the specific surface area of this carbon as measured by the BET method is 270 $m^2/g$, preferably less than 100 $m^2/g$, the interplanar spacing $d_{002}$ is approximately 0.36 to 0.38 nm.

Other objects and features of the invention will appear in the course of the description thereof, which follows.

DESCRIPTION OF THE PREFERRED EMBODIMENTS

In the present embodiment, examples of the carbon material to be processed include materials for activating polarizable electrodes for use in electrical double-layer capacitors, such as porous carbon (e.g., activated carbon) and nonporous carbon. Whatever carbon material is used, an activated and dried product is used as the carbon material that serves as a starting raw material for the method of removing active oxy-hydrogens according to the present invention. Nonporous carbon acting as a carbon material that is used as a starting raw material is first described briefly.

Figure 3:
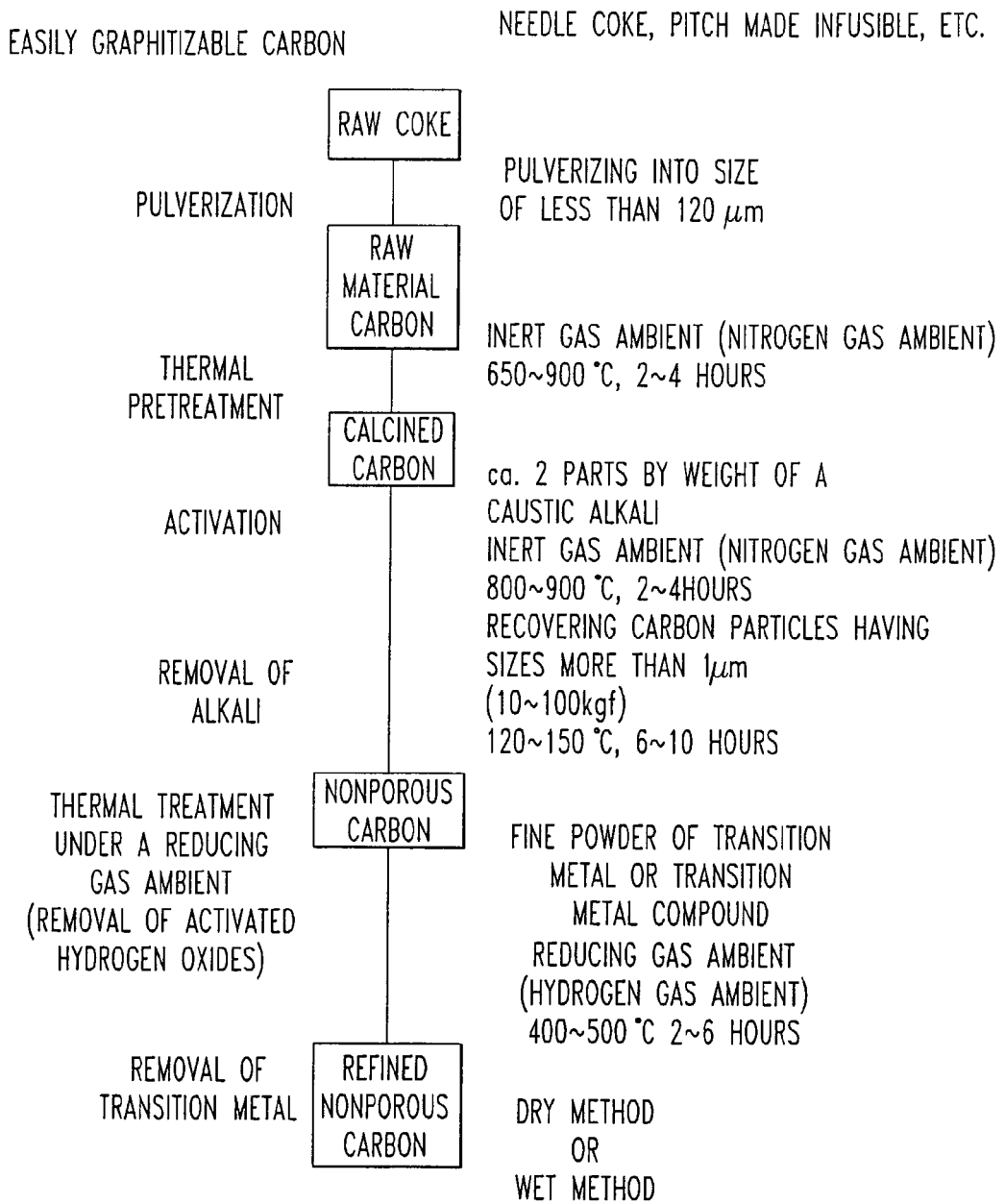
FIG. 3 is a diagram schematically illustrating a method of preparing a nonporous carbon and a refined carbon material.

FIG. 3 schematically illustrates a method of producing a nonporous carbon and a refined nonporous carbon that is one of the refined carbon materials obtained using the nonporous carbon as a starting raw material. With respect to the carbon material (nonporous carbon) acting as a starting raw material in the present invention, raw coke, such as needle coke or pitch, made infusible is dry distilled at 300° C.–400° C. to obtain an easily graphitizable carbon from which volatile components have been removed. The raw coke is pulverized into sizes of less than 120 µm to thereby obtain a "raw material carbon". This raw material carbon is thermally treated within an inert gas ambient (e.g., within a nitrogen gas ambient) at 650° C.–900° C., preferably 700° C.–800° C., for 2 to 4 hours. This thermal pretreatment gives rise to a "calcined carbon". The obtained calcined carbon is mixed with 1.8–2.2 parts (preferably about 2 parts) by weight of a caustic alkali (such as KOH) and again heated within an inert gas ambient (e.g., within a nitrogen gas ambient) at 760° C.–900° C. (preferably, about 800° C.) for 2 to 4 hours to activate the mixture with the caustic alkali. Then, the alkali remaining in the carbon is removed in the manner described below.

The alkali is removed by washing the obtained carbon after the alkali activation. The washing can be carried out, for example, by recovering carbon particles having sizes more than 1 µm from the alkali-treated carbon, loading them into a column of stainless steel, and keeping supply of a stream of water vapor under pressure of 10–100 kgf/m$^2$, preferably 10–50 kgf/m$^2$ into the column at 120° C.–150° C. until the pH of the discharged water becomes about 7. This process is usually effected for 6 to 10 hours. After the end of the alkali-removing step, an inert gas, such as argon or nitrogen, is passed through the column to dry it, thus obtaining the desired nonporous carbon.

Meanwhile, where an activated carbon is produced, if the above-described raw material carbon is thermally treated together with KOH directly at 800° C., micropores are formed. Thus, activated carbon is produced. Alkalis are removed in the same way as in the process described above. Then, an inert gas, such as argon or nitrogen, is passed through the column to dry the material. In this way, the desired activated carbon is derived.

The nonporous carbon or activated carbon obtained in this way has hetero element-containing functional groups, such as COOH, CHO, and phenolic OH, on the carbon surface. In the present invention, active oxy-hydrogens included as hetero element-containing functional groups are removed. Specifically, the method of removing these active oxy-hydrogens is illustrated in FIG. 3. This method starts with preparing the starting raw material, or the nonporous carbon. This nonporous carbon is mixed with a transition metal or transition metal compound. The mixture is thermally treated in a reducing gas ambient, such as a hydrogen gas stream. Then, the transition metal or transition metal compound is removed from the processed mixture to thereby obtain a refined nonporous carbon. The "dry method" put in FIG. 3 in connection with removal of the transition metal means a method of directly separating powdered carbon and transition metal or transition metal compound from the thermally treated mixture of the powdered carbon and the transition metal or transition metal compound by a process described later. The "wet method" means a method of separating them by once dispersing thermally processed powdered carbon and transition metal or transition metal compound in a solvent, then separating them by a method described later, removing the solvent, and performing a drying process. The "wet method" can also be a method consisting of processing the thermally processed powdered carbon and transition metal or transition metal compound by a chemical agent, such as a solution of an acid or base, to change the transition metal or transition metal compound into a dissolvable salt and dissolving out the salt, thus removing the transition metal or transition metal compound using the liquid medium.

Preferably, the carbon material, such as nonporous carbon or activated carbon, used as a starting raw material in the present invention generally lies in the range from 1 to 100 µm, preferably approximately from 20 to 60 µm.

In the method of removing residual hydrogen oxides in accordance with the present invention, a transition metal or transition metal compound is mixed with the aforementioned carbon material. Then, the mixture is thermally processed under a reducing gas ambient.

Examples of the used transition metal include metal elements of groups 3 to 11 of the periodic table. Fe, Ni, Co, Cu, Mo, Cr, Mn, and Th are especially desirable.

The used transition metal may be only one of these metals or an alloy containing such a metal element (e.g., Permalloy (Fe—Ni alloy) and iron-cobalt (Fe—Co) alloy). The transition metal mixed with the carbon material may assume the form of chips, flakes, fibers, and thin wires, as well as fine powder. Furthermore, the transition metal can be a mesh product obtained by working thin wires. In addition, the transition metal may be a dendritic or floccular product. Examples of such wrought products include brushes and sponge nickel. Where such a wrought product is used, it is easy to separate the carbon material and the transition metal after processing.

Where a transition metal is used intact and assumes a powdered form, the grain diameter is preferably approximately 3 to 30 µm, more preferably approximately 3 to 10 µm.

Where a mixing step is performed, any one of the aforementioned transition metals can be used alone or two or more transition metals can be used in combination. The ratio of the transition metal mixed with the carbon material needs to be so set that the transition metal is uniformly dispersed after the mixing. Generally, 0.5 to 50 parts, preferably approximately 1 to 5 parts, by weight of the transition metal is used per 100 parts by weight of the carbon material, though the ratio varies according to the shape of the added transition metal.

The carbon material and powder of a transition metal, for example, are mixed and dispersed together sufficiently. Then, the mixture is thermally treated under a reducing gas ambient at 200° C. to 850° C., preferably 400° C. to 500° C. for about 2 to 6 hours. Af of the thermal treatment, the carbon material and the powdered transition metal are separated. The powdered transition metal is recovered. A refined carbon material from which active oxy-hydrogens have been removed is obtained. The thermal treatment described above is performed in a reducing ambient. With respect to the conditions of the reducing ambient, the ambient is preferably a stream of hydrogen gas or mixture gas obtained by diluting hydrogen with an inert gas. Industrially, $3H_2+N_2$ obtained by decomposing NH3 using $Fe_2O_3$ catalyst can be used as the mixture gas. Regarding the flow rate of hydrogen gas, about 0.2 to 0.5 liter/min per 100 g of carbon suffices.

It is considered that a method of removing and recovering the powdered transition metal in terms of a distinct physical difference between the carbon and the transition metal is feasible. Generally, a difference in density can be employed.

More specifically, the density of carbon is less than 2.0 g/cm$^3$. On the other hand, metals have much greater densities than carbon. For instance, Fe: 7.87 g/cm$^3$
Ni: 8.91 g/cm$^3$
Co: 8.90 g/cm$^3$
Cu: 8.96 g/cm$^3$
Mo: 10.22 g/cm$^3$
Cr: 7.14 g/cm$^3$
Mn: 7.43 g/cm$^3$
Th: 11.85 g/cm$^3$ Accordingly, where grain diameters are substantially equal, they can be easily removed using a powder separator, such as a cyclone separator. However, where quite fine powder of a transition metal is mixed with powdered carbon having relatively large grain diameters, the separation would not be complete. In this case, the transition metal and carbon are forcedly dispersed in a liquid having a density midway between those of the transition metal and carbon with ultrasonic means, the liquid exhibiting good wettability to both. In this case, the powdered carbon floats, while the metal deposits. Consequently, they can be separated easily. Then, the carbon and transition metal are separated and recovered by an ordinary solid-liquid separation technique, such as filtering.

If the transition metal is a ferromagnetic material, such as Fe, Ni, or Co or an alloy of such a ferromagnetic material, separation can be easily carried out by making use of the difference in magnetism.

A simple experimental method can be implemented as follows. A strong magnet wrapped in a poly bag is inserted into a carbon sample. The sample containing the magnet is placed on a mesh, which, in turn, is placed above a filter paper within a vacuum filter. Vibration is given to the vacuum filter. Powdered carbon is separated from powder of the transition metal (or metal alloy) caught in the magnet and recovered onto the filter paper. Alternatively, a mesh of a ferromagnetic material, such as soft iron, is inserted into a cylindrical coil, and the mesh is magnetized from outside using an electromagnet. Then, the powdered magnetic material will be left on the mesh. The powder of carbon is separated by air stream flowing through the cylinder. The powder will collect on the filter mounted at the tip of the cylinder. Where the current for the magnetization is an alternating current, the whole shape of the magnetic powder can be changed. The powdered carbon taken in together with the powder of the magnetic material is separated and recovered. After recovering the powdered carbon, the magnetic material collected on the mesh can be recovered by switching the acting force. This is achieved by turning on and off the magnetizing current. Consequently, convenience is offered. The capturing effect and the easiness with which the magnetic material is removed differ depending on the grain size of the powdered sample and on the grain size of the magnetic material. Therefore, a close examination is necessary in applying this method to a practical instrument.

This ferromagnetic material can be removed by dispersing the mixture, which was thermally processed in a reducing ambient, in a solvent by ultrasonic means, removing and recovering the ferromagnetic material of Fe, Ni, or Co or its alloy using a magnet, then removing the solvent, and performing a drying step. This method is adapted for a case in which carbon particles and particles of a transition metal are strongly bound together in powder form (i.e., in dry state) and thus cannot be easily separated.

Examples of the solvent used for the dispersion include water, acetonitrile, diethyl carbonate, methanol, and other organic solvents.

Transition metal compounds used in the present invention are compounds of the above-described transition metals. The compounds are thermally decomposed into volatile materials at the processing temperature and reduced into metals. Examples of these compounds include chlorides of transition metals, inorganic compounds of sulfides, and organic acids and salts, such as acetates. Where these transition metal compounds are mixed with a carbon material, a compound in solid or liquid phase is not directly mixed with the carbon material. Rather, such a transition metal compound is preferably once dissolved in water or organic solvent to prepare a solution. This is impregnated into the carbon material. Then, the water or organic solvent is evaporated off. The transition metal compound is carried on the carbon material. In this case, the amount carried is more than 0.1%, preferably more than 0.5%, by weight of carbon in terms of the amount obtained when reduced into a metal, though the value varies according to the kind of the transition metal compound.

It is estimated that these transition metal compounds are generally deoxidized during thermal processing and that most of them act as transition metals. After the thermal processing, the transition metal compound can be isolated using a magnet, if the compound is a ferromagnetic material, in the same way as in the case of a transition metal. Such a transition metal compound may also be separated and removed from the carbon material by solubilizing the metal compound by an acid or alkali and performing a washing step.

Generally, where a transition metal compound is carried on a carbon material, it may be more difficult to separate the compound only by the aforementioned physical separation method than where fine powder of a transition metal compound is physically added as mentioned previously, because the deoxidized transition metal compound is relatively finely dispersed atomically on the carbon material. In this case, a chemical method is effective in completely removing the transition metal from the carbon. That is, carbon is chemically inert and is not readily attacked by acids or alkalis. Therefore, the transition metal can be separated and removed by converting the transition metal on carbon into a soluble salt by an acid or alkali and then performing a washing step. However, if the removed functional groups are again formed by processing with the acid or alkali, then the process would be meaningless. Accordingly, the used acid or alkali is so selected that the reaction product produced by reaction of the acid or alkali with the transition metal is soluble and that the carbon itself is affected only a little. One example of such a material is aqueous solution of HF.

That the transition metal or transition metal compound is removed from the carbon material after thermal treatment is not always essential. However, where it is used as a material for activating polarizable electrodes of an electrical double-layer capacitor, it is desirable to remove the residual transition metal or transition metal compound to secure reliability of the assembled polarizable electrodes.

More specifically, if transition metals, such as Fe, Ni, and Co, are present in metal form within the carbon material, no problems will take place provided that the electrical double-layer capacitor is fabricated using an ideal electrolyte solution. In fact, an electrical double-layer capacitor made of a carbon material in which transition metals are left presents no problems in the initial stage of a charge-discharge test. However, after prolonged use, the capacity may decrease.

The internal resistance may increase. The charge-discharge efficiency may deteriorate due to increases in the wattless current. The cause is understood as follows. It is known that electrolysis ions $BF_4^-$ react slowly in the presence of water and form various kinds of fluorine-containing acids including HF. Therefore, it is considered that fluorine-containing acids produced by these reactions react with transition metals to produce transition metal ions within the electrolyte solution, thus causing various electrochemical reactions.

Electrical double-layer capacitors, Li-ion batteries, and other structures are so devised as to minimize the amount of water contained. However, it is difficult to completely eliminate water. Where modified forms of water different from free water are present (i.e., hydrogen atoms contained in COOH, CHO, and OH are present), an electrochemical reaction occurs if the device is operated at a relatively high voltage of more than 2.5 V, for example. As a result, free water might be produced gradually. In this way, it is inevitable that a trace amount of water exists within an electrical double-layer capacitor, Li-ion battery, or other structure. Therefore, even if this trace amount of water causes $BF_4^-$ to produce fluorine-containing acids, no problems will occur unless any transition metal reacting with the fluorine-containing acids is present. Consequently, it is desired that transition metals, such as Fe, Ni, and Co, do not remain in the carbon material.

If fine particles of ferromagnetic materials, such as Fe, Ni, and Co, are left in the carbon material, observation of lateral relaxation times by pulsed NMR spectroscopy (described later) reveals that the lateral relaxation time T2 of hydrogen nucleus observed by pulsed NMR spectroscopy is shorter than the original value because the fine particles of the ferromagnetic materials disturb the uniformity of a nearby magnetic field.

Measurement of $^1H$ resonance using pulsed NMR spectroscopy to quantitatively evaluate the amount of active oxy-hydrogens present on carbon is next described. The amount of active oxy-hydrogens can be found in the manner described below from the short relaxation time component T2=17 to 50 μsec (Gaussian type) and the moderate relaxation time component T2=55 to 400 μsec (Lorentzian type) of the lateral relaxation time constants obtained by measurements.

Figure 4:
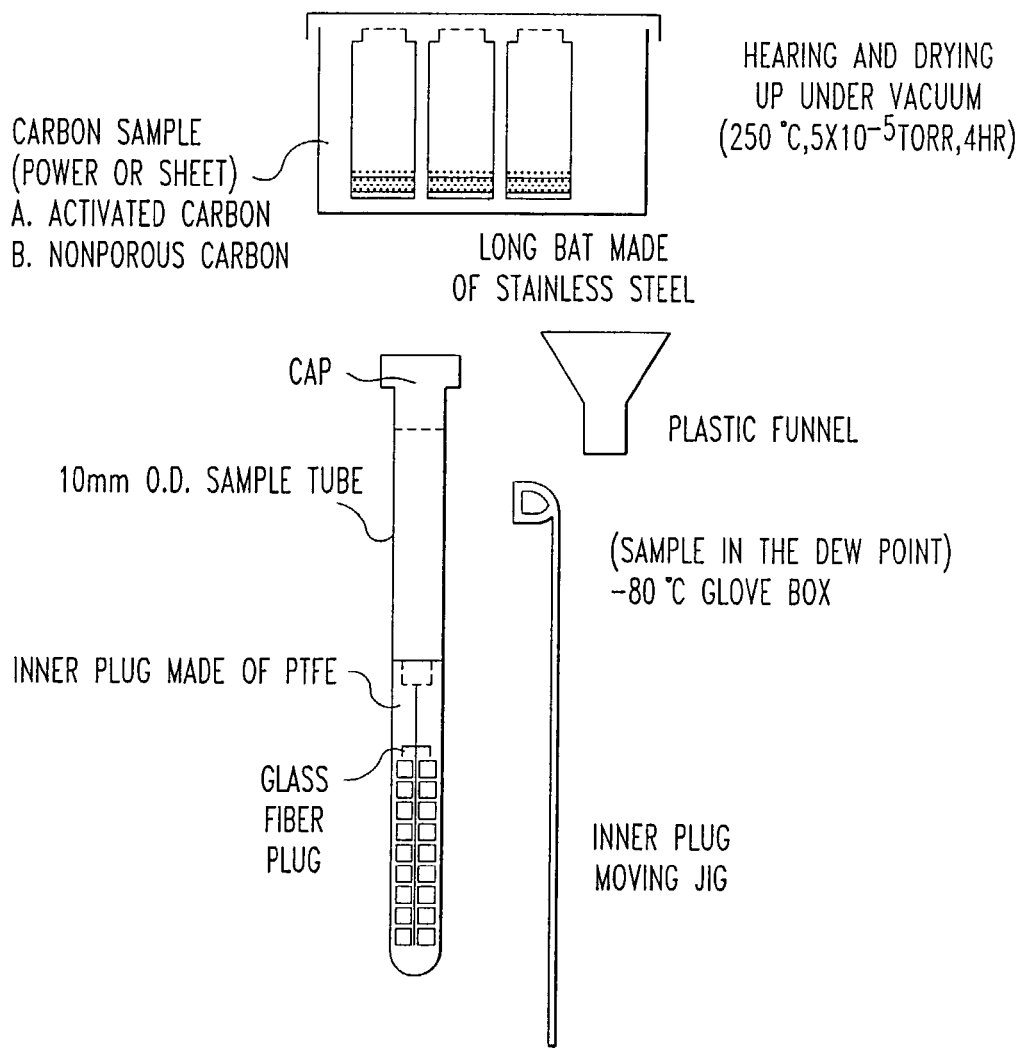
FIG. 4 is a schematic view illustrating the manner in which a sample for pulsed NMR measurements is prepared.
Figure 4:
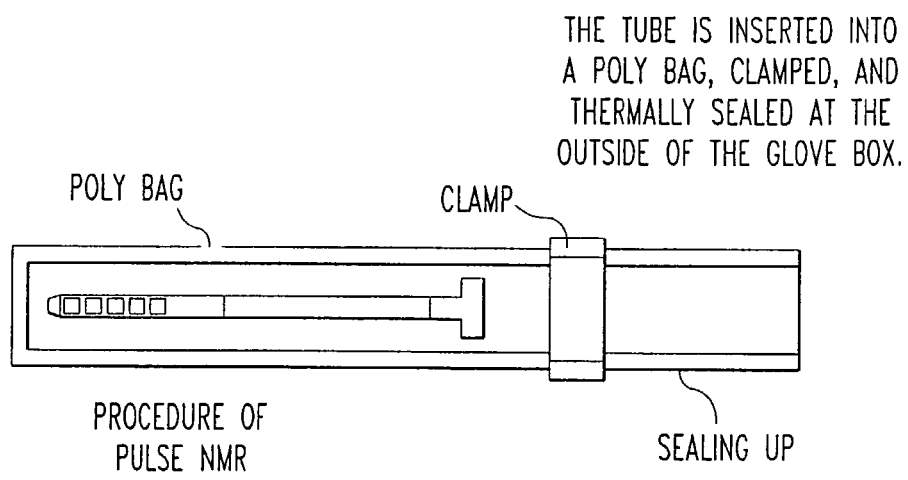

FIG. 4 schematically illustrates a method of preparing a carbon sample to find relaxation time constants using pulsed NMR spectroscopy. Specifically, a glove box having a dew point of approximately −80° C. is prepared. A small amount of sample is put into a long glass bottle within a vacuum heating-and-bakeout furnace adjacent to the glove box. The bottle is placed in a long bat made of stainless steel, and then the cover is placed on it gently. Subsequently, the sample is baked out slowly.

After the bakeout, the sample is taken out from inside the door of the glove box and loaded into an NMR sample tube having a diameter of 10 mm as shown in FIG. 4. The sample is made stationary by an inner plug made of PTFE (polytetrafluoroethylene). Glass filter fibers are loaded into the center of the inner plug to prevent the powder sample from going out despite a stream of the inside gas on insertion.

The tube is plugged with a dedicated cap, inserted into a laminate poly bag, and clamped. The tube is taken out of the glove box and thermally sealed.

The tube is preserved under the conditions described above. The seal is broken immediately prior to measurements, the sample is taken out, and the measurements are made. The sample filling length (L) and the net weight (W) of the carbon are used in correcting the sample filling.

Measurement of $^1H$ resonance using pulsed NMR spectroscopy is performed in the manner described below.

A first pulse having a measuring frequency of 25 MHz and a pulse width Pw1 of 2.0 μsec is applied, and then a second pulse that has the same pulse width as that of the first pulse and is shifted in phase by 90° with respect to the first pulse is applied after a pulse interval Pi1 of 8.0 μsec. After a lapse of a duration of 2 Pi1, the resulting echo signal is observed. This sequence of operations is repeated 128 to 512 times at intervals of 2.0 seconds. The signal is accumulated, and data is collected.

Where $^1H$ resonance is performed in a powdered state as described above by a pulsed NMR spectrometer, a decay signal consisting frequently of two or three components having different relaxation times and overlapping each other is observed. One component is a short component having a lateral relaxation time T2 of usually 17 to 50 μsec (but if the carbon carried residual ferromagnetic particles, shorter relaxation times, such as 10 μsec appeared), and can be approximated by a resonance line showing a Gaussian distribution. Even if the carbon is sintered at 80° C. this component does not vary. This component consists of hydrogen atoms directly bonded to the edges of graphene (outer ring carbon of skeleton). Besides, there is a moderate relaxation time constant having a lateral relaxation time T2 of 55 to 400 μsec exhibiting a Lorentzian distribution. This component does not disappear in a short time even if the sample is heated and dried in a vacuum. This corresponds to chemically adsorbed water and originates from functional groups including oxygen and hydrogen atoms, such as COOH, CHO, OH, and so on. Hydrogen atoms owing to physically adsorbed water having a still longer relaxation time T2 =500 to 2000 μsec are also observed, but these are mostly removed by the aforementioned heating and drying in a vacuum.

"Hydrogen atoms directly bonded to the edges of graphene [outer ring carbon of skeleton]" referred to herein consist of a short relaxation time component having T2=17 to 500 μsec (Gaussian type) and hydrogen atoms arising from hetero element-containing functional groups including oxygen and hydrogen atoms, such as COOH, CHO, and OH. That is, active oxy-hydrogens referred to herein are a moderate relaxation time component having T2=55 to 400 μsec (Lorentzian type).

In particular, the removing method according to the present invention reduces the moderate relaxation time component T2=55 to 400 μsec (Lorentzian type). Thermal treatment within a reducing ambient (such as in a hydrogen gas stream) terminates or blocks active sites within carbon, forming hydrogen atoms directly bonded to the edges of graphene (outer ring carbon of skeleton). Therefore, it is estimated that the short relaxation time component T2=17 to 50 μsec (Gaussian type) increases. Accordingly, where the refined carbon material from which active oxy-hydrogens have been removed in accordance with the present invention is used as a material for activating the carbon in polarizable electrodes for use in an electrical double-layer capacitor, for example, if the ratio of the short relaxation time component T2=17 to 50 μsec (Gaussian type) to the moderate relaxation time component T2=55 to 400 μsec (Lorentzian type) is less than one third, preferably less than one fifth, stable characteristics are obtained. That is, no gas is produced. No electrically nonconducting film is formed. The internal resistance does not increase.

Hydrogen atoms directly bonded to carbon are produced by terminating or blocking the active sites within carbon with hydrogen atoms. When the refined carbon material is taken into the air again after the processing, these hydrogen atoms act to prevent the active sites within the carbon from being reconverted into COOH, CHO, OH, and so on due to oxygen and water in the air.

Figure 6A:
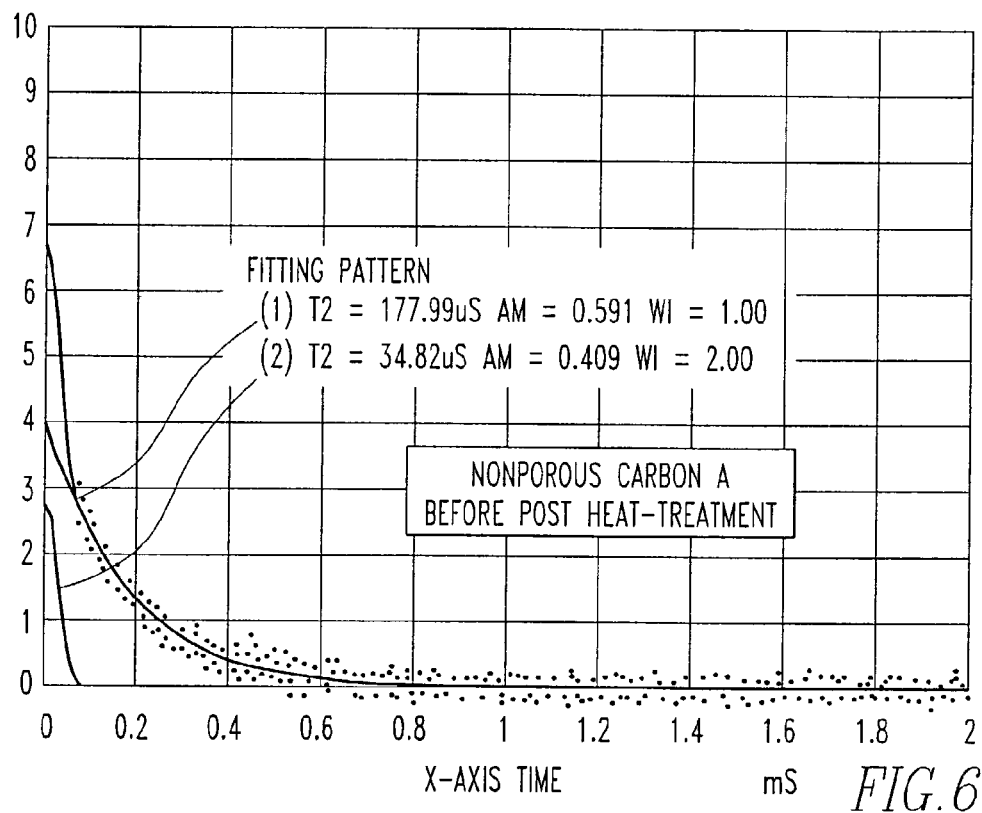
FIGS. 6(a), 6(b), and 6(c) are graphs illustrating the results of pulsed NMR measurements of carbon materials that are different activated carbon materials before post-treatment to be processed.
Figure 6B:
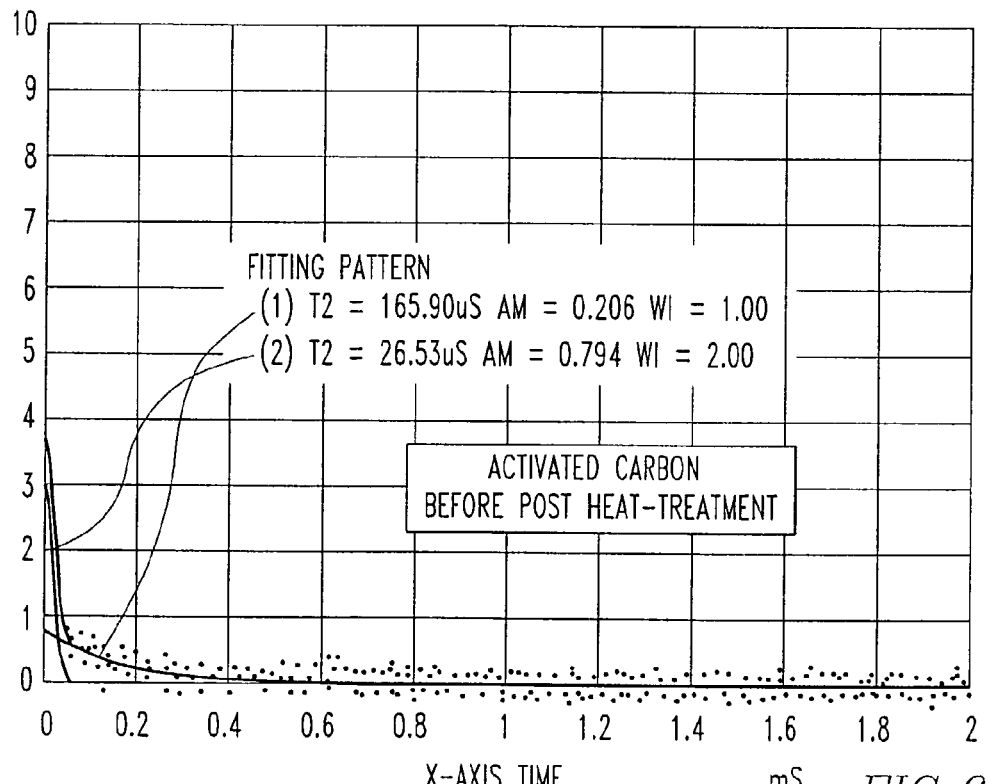
Figure 6C:
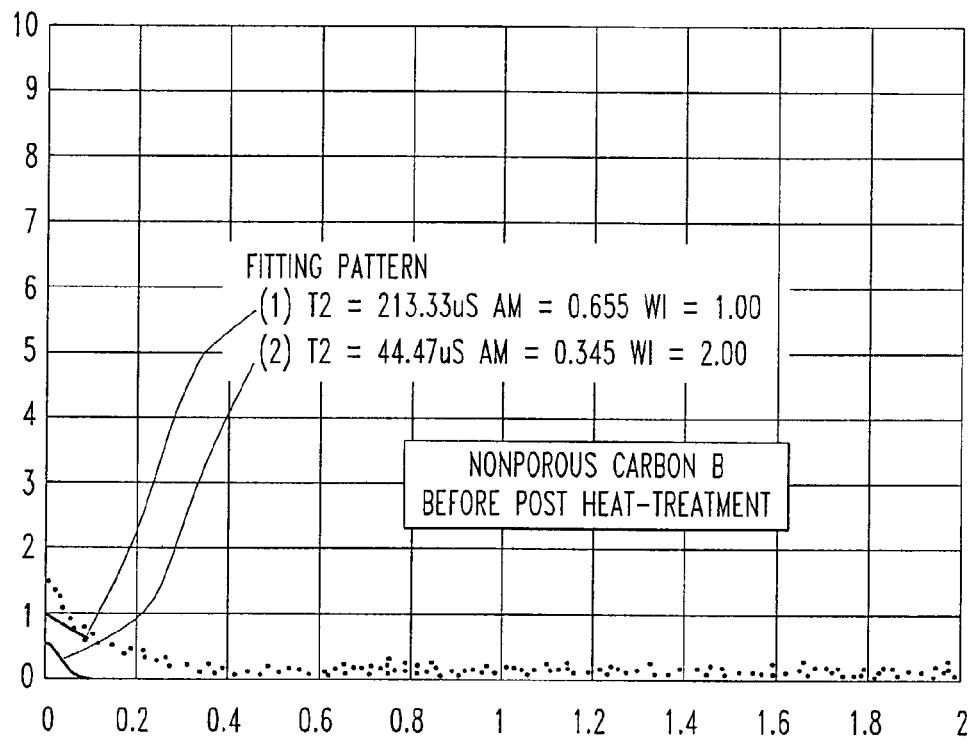

As one example of obtained analysis results, the results of measurements of a carbon material that is yet to undergo the processing for removing active oxy-hydrogens according to the present invention are shown in FIGS. 6(a)–6(c) show the results of measurements of nonporous carbon A obtained by processing petroleum-based needle coke. FIG. 6(b) shows the results of measurements of phenolic resin-based, KOH-activated carbon MPS-20. FIG. 6(c) shows the results of measurements of nonporous carbon B obtained by processing petroleum-based needle coke of a different carbon species. In FIG. 6(a), the initial rising intensity indicates the total amount of hydrogen nuclei within the observed sample. The decay curve was analyzed. Combinations of components having different decay times were calculated, and line fitting was done. The results are shown. Line (1) indicates a moderate relaxation time component having a lateral relaxation time $T2 = 177.99$ μsec. The amount of the component is 0.591 (in arbitrary units AM; the value assumed where the total amount of hydrogen nuclei is set to 1.000). This convention also applies to the following description. Line (2) indicates a short relaxation time component having a lateral relaxation time $T2 = 34.82$ μsec. The amount of the component is 0.409. In this case, the ratio of the moderate relaxation time component to the short relaxation time component is $0.591/0.409 = 1.445$. Similarly, with respect to FIGS. 6(b) and 6(c), the ratios are calculated to be 0.259 and 1.899, respectively.

The carbon material (refined carbon material) from which active oxy-hydrogens have been removed by the method according to the present invention can be used as a material for activating carbon for use in polarizable electrodes in an electrical double-layer capacitor or the like. These polarizable electrodes can be fabricated by the same method as used to fabricate conventional polarizable electrodes in an electrical double-layer capacitor. For example, where an electrode in sheet-like form is fabricated, the obtained refined carbon material is pulverized into sizes of about 5 to 100 μm and the grain sizes are regulated. Then, carbon black acting as an electrical conduction auxiliary agent for giving electrical conductivity to the powdered carbon and a bonding agent consisting, for example, of polytetrafluoroethylene (PTFE) are added and kneaded together. The mixture is flat-rolled into a sheet. The conduction auxiliary agent can be powdered graphite, as well as carbon black (e.g., acetylene black). Examples of the bonding agent include PVDF, PE, and PP, as well as PTFE. The compounding ratio between the nonporous carbon, the conduction auxiliary agent (carbon black), and the bonding agent (PTFE) is generally approximately 10:0.5–1.0:0.5–0.25.

A charge collector is mounted to each polarizable electrode fabricated in this way. The electrodes are stacked on top of each other via a separator. Thus, positive and negative electrodes are formed. Then, an organic solvent including an electrolysis is impregnated into them. In this way, an electrical double-layer capacitor can be assembled.

Where nonporous carbon is used as the carbon-activating material, an interface forming an electrical double layer does not exist substantially at the beginning of assembly of the electrical double-layer capacitor. When the applied voltage exceeds a certain threshold value during initial charging, electrolyte ions enter the carbon structure together with the solvent. As a result, an interface forming an electrical double layer is formed at the first time. This interface is subsequently maintained by a hysteresis effect and, thus, the electrical double-layer capacitor functions effectively. Therefore, it is necessary at first to apply a voltage higher than the rated voltage by 10 to 20% (normally, 3.5 to 3.75 V) to charge the capacitor. Where activated carbon is used as a material for activating carbon, an electrical double layer can be formed immediately after the capacitor is assembled. It can be used as an electrical double-layer capacitor intact without any operation, such as initial charging. The present invention is hereinafter described in further detail using its examples.

Experimental Example 1

As illustrated in FIG. 3, a petroleum-based needle coke was used as a raw material carbon. This was pretreated at 750° C. for 4 hours in an inert gas ambient, thus producing "calcined carbon". Two parts by weight of KOH was added to the carbon. The mixture was processed at 800° C. for 4 hours to activate it. Then, the mixture was washed with water to remove the alkali components. Subsequently, the mixture was dried to thereby obtain nonporous carbon A. Then, 0.5 g and 1.5 g of powder of metal Co (31G produced by Moritec Co., Ltd., Japan, having a purity of 99.8%; 200 mesh (less than 74 μm)) were added to two samples, respectively, of the nonporous carbon A each having a weight of 3 g. Each mixture was ground well with a pestle within a mortar to disperse the powder of metal Co in the nonporous carbon sufficiently.

Figure 5:
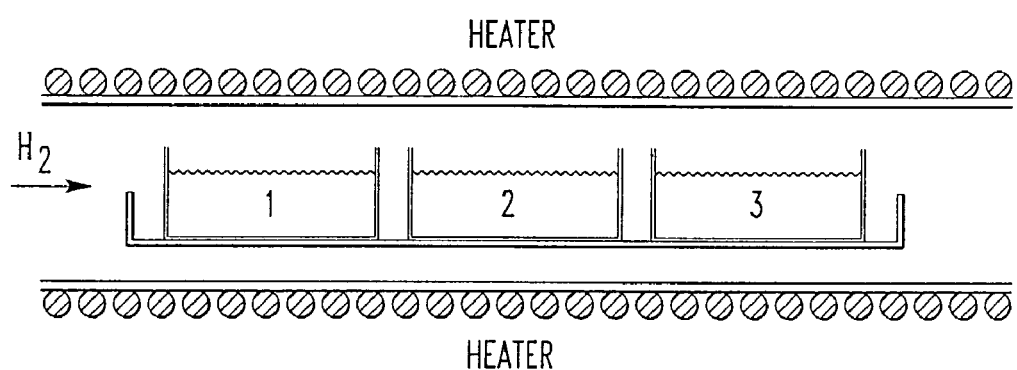
FIG. 5 is a schematic view of an electric furnace used for thermal treatment experiments.

Then, three boat-like containers made of alumina and each having a capacity of about 10 ml were prepared. The nonporous carbon in which the above-described metal Co was dispersed was loaded into two of the boat-like containers. The nonporous carbon to which metal Co was not added was loaded into the remaining one. The loaded carbon was 3 g each. These three boats were arranged in a line in the core of a horizontal vacuum furnace as shown in FIG. 5. Thermal treatments were performed as follows. The boat-like containers of alumina were placed on a guide plate and inserted into the core of the cylindrical furnace made of stainless steel. A reducing gas, such as hydrogen, was kept supplied at a flow rate of about 0.2 l/min. The three boat-like containers were loaded with three different carbon samples, respectively. In the first sample, no metal Co was added. In the second sample, 0.5 g of metal Co was contained. In the third sample, 1.5 g of metal Co was contained. Under this condition, the temperature was elevated, and then the set temperature (e.g., 500° C) was maintained. Each sample was allowed to stand for 4 hours. Then, each sample was left to stand to cool it.

The temperature distribution within the furnace was kept within ±10° C. of the set temperature. The processing temperature was elevated to 500° C. and then maintained for 4 hours. Then, the equipment was cooled down to room temperature. Subsequently, each processed sample was taken out.

Each sample taken out was moved into a shallow plastic container, and a small-sized rare-earth magnet wrapped in a poly bag was inserted. The sample was stirred, followed by recovery of the powder of the metal Co. Since a large amount of carbon powder was taken in the powder of the metal Co attracted to the magnet at this time, the aforementioned sequence of operations was repeatedly performed. The powder of the metal Co and the powder of carbon were separated. As a result, about 3 g of processed carbon material (refined carbon material) was obtained. The obtained samples of refined carbon material were evaluated as follows.

Figure 7A:
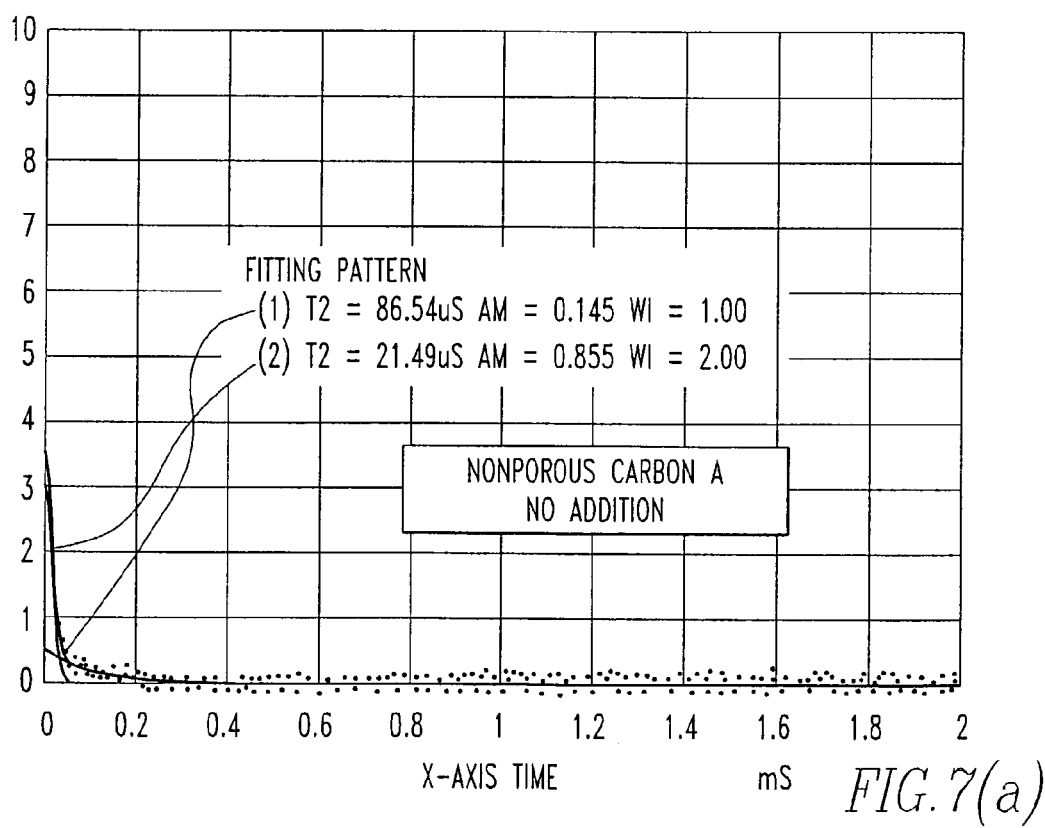
FIGS. 7(a), 7(b), and 7(c) are graphs illustrating the results of pulsed NMR measurements of refined carbon materials obtained from nonporous carbon material A by processing using Co.
Figure 7B:
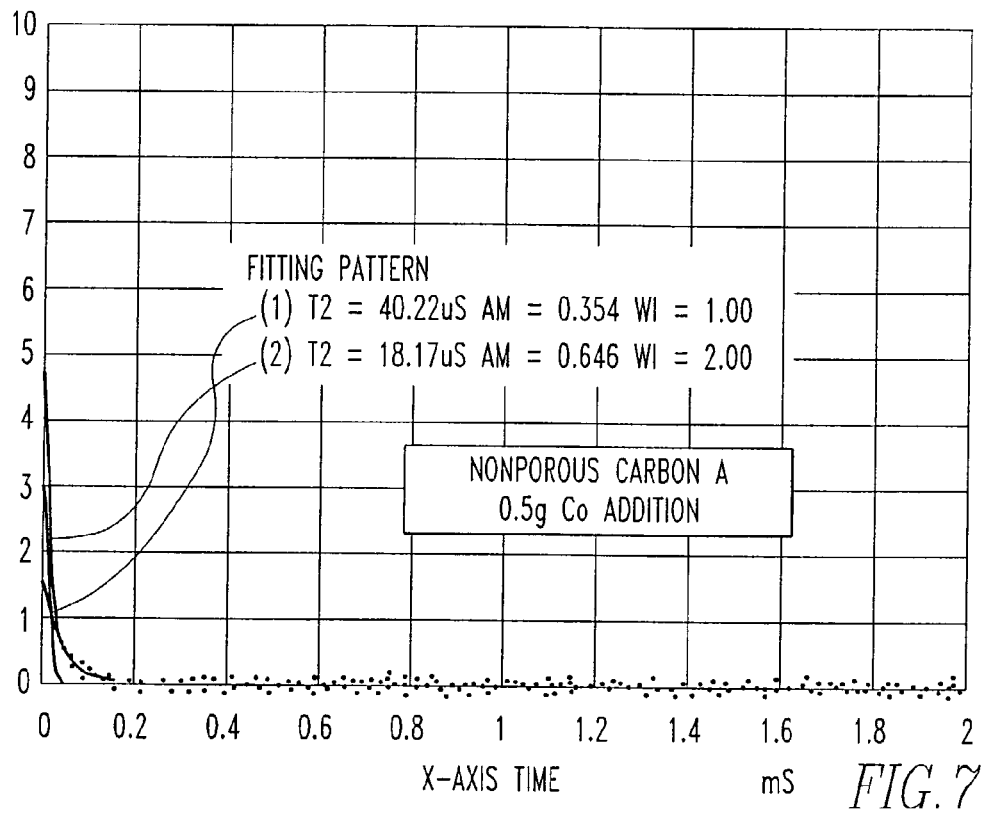
Figure 7C:
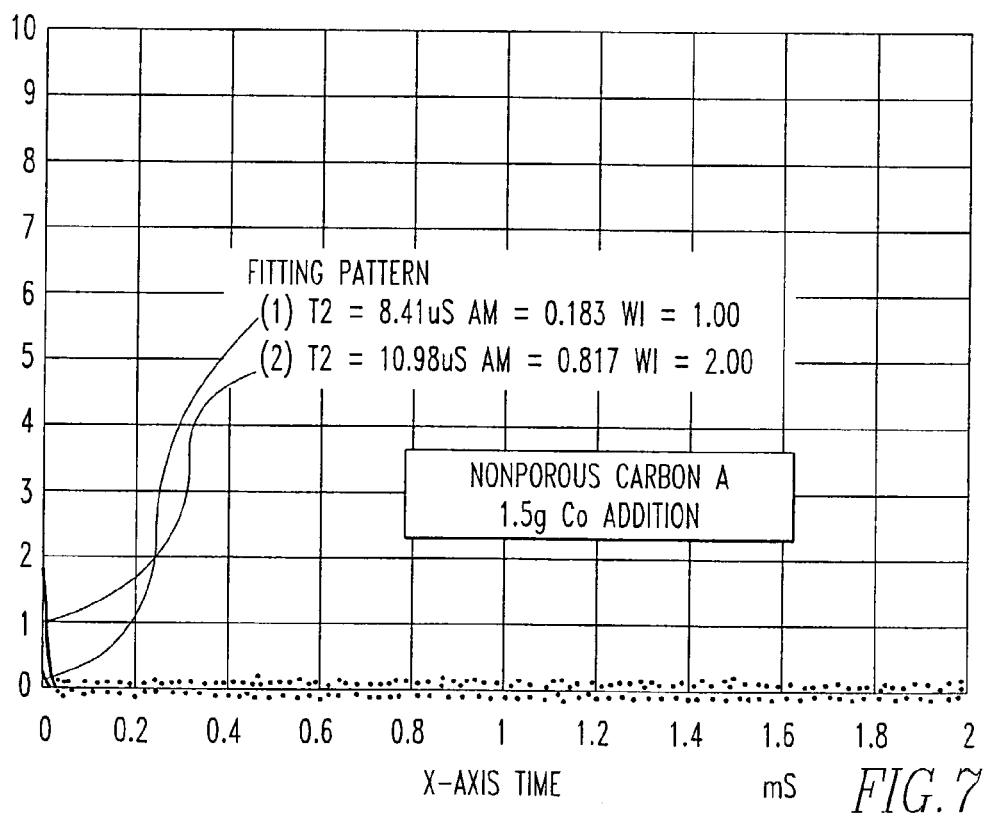

1) The Amount of Existence of Active Oxy-hydrogens in a Carbon Material, Measured by Pulsed NMR As illustrated in FIG. 4, powder of the obtained, refined carbon material was returned to the boat-like container used for the processing. The container was placed on an aluminum bat and received into a vacuum bakeout furnace adjacent to a glove box. The powder was dried at 250° C. at $5\times10^{-5}$ torr for 4 hours. After the powder was allowed to stand to cool it, it was taken into the glove box. Then, the powder was loaded into a previously prepared sample tube used for NMR analysis. The tube was received into a poly bag, and then the bag was sealed. The sample was preserved under his condition. The bag was opened immediately prior to a measurement. The measurement was performed by a pulsed NMR spectrometer INM-MU25 manufactured by JEOL Datum Ltd., Japan. The measurement method and measuring conditions have been described previously. The obtained results are shown in FIGS. 7(a)–7(c) and Table 1. FIG. 7(a) indicates the results of measurements of the sample to which Co was not added. FIG. 7(b) indicates the results of measurements of the sample to which 0.5 g of Co was added. FIG. 7(c) indicates the results of measurements of the sample to which 1.5 g of Co was added.

TABLE 1

| carbon species & processing conditions | moderate relaxation time component (m), μsec | | short relaxation time component (s), μsec | | m/s | Experimental Example |
|---|---|---|---|---|---|---|
| carbon material | | | | | | |
| nonporous carbon A | 177.99 | 0.591 | 34.82 | 0.409 | 1.445 | |
| activated carbon MSP-20 | 165.90 | 0.206 | 26.53 | 0.794 | 0.259 | |
| nonporous carbon B | 213.33 | 0.655 | 44.47 | 0.345 | 1.899 | |
| refined carbon material | | | | | | |
| A + 504H | 86.54 | 0.145 | 21.49 | 0.855 | 0.170 | 1 |
| A + Co + 504H | | | 40.22 | 0.354 | 0 | |
| | | | 18.17 | 0.646 | | |
| A + 3Co + 504H | | | 10.98 | 0.817 | 0 | |
| | | | 8.41 | 0.183 | | |
| A + 504H | 236.28 | 0.591 | 14.94 | 0.409 | 1.445 | 4 |
| A + Fe + 504H | 78.99 | 0.250 | 24.60 | 0.750 | 0.333 | |
| A + 3Fe + 504H | 59.33 | 0.144 | 21.17 | 0.856 | 0.168 | |
| A + 504H | 116.01 | 0.256 | 25.13 | 0.744 | 0.344 | 5 |
| A + Ni + 504H | 0 | | 17.34 | 1.000 | 0 | |
| A + 3Ni + 504H | 0 | | 24.40 | 1.000 | 0 | |
| A + 304H | 116.31 | 0.717 | 36.91 | 0.283 | 2.534 | 6 |
| A + Co + 304H | 57.16 | 0.650 | 28.31 | 0.350 | 1.857 | |
| A + 3Co + 304H | 63.74 | 0.553 | 25.52 | 0.447 | 1.237 | |
| B + 504H | 120.75 | 0.684 | 23.96 | 0.316 | 2.165 | 3 |
| B + Co + 504H | 0 | | 8.11 | 1.000 | 0 | |
| B + 3Co + 504H | 0 | | 10.92 | 1.000 | 0 | |
| MSP-20 + 504H | 165.90 | 0.206 | 26.53 | 0.794 | 0.259 | 2 |
| MSP-20 + Co + 504H | 0 | | 20.31 | 1.000 | 0 | |
| MSP-20 + 3Co + 504H | 0 | | 28.20 | 0.755 | 0 | |
| | | | 8.23 | 0.245 | | |
| A + 504H | 729.73 | 0.250 | 23.69 | 0.750 | 0.333 | 7 |
| A + NiAc + 504H | 0 | | 12.84 | 1.000 | 0 | |
| A + 3NiAc + 504H | 0 | | 15.61 | 1.000 | 0 | |

*The lateral relaxation times ($T_3$ = 55 to 400 μsec) of the moderate relaxation time components are outside a prescribed range but these values are adopted as moderate relaxation time constants intact.

In Table 1, the "carbon species & processing conditions" column indicates the kind of carbon material used and thermal processing conditions. The kind of transition metal and thermal processing temperature are indicated on the upper two lines, in addition to the kind of carbon material. The processing time is indicated on the third line. Symbol "H" is attached to the end to indicate the processing ambient, or a hydrogen gas stream. Chemical element symbols indicate added metals. Each item having no such symbol indicates no addition. Numerals attached to each element symbol indicate the amount of the added metal. It is to be noted that "3" indicates a threefold amount. For example, in the case of Experimental Example 1, "nonporous carbon A" is used as a carbon material, and 0.5 g of Co is added to 3 g of carbon. A material that was thermally processed at 500° C. for 4 hours within hydrogen is designated as "A+Co+504H". A material to which 1.5 g of Co, or a threefold amount, was added is designated as "A+3Co+504H".

2) Evaluation of Electrical Double-layer Capacitors in Terms of Charge-Discharge Characteristics

2-1) Fabrication of Carbon Electrodes and Capacitors

A polarizable electrode for evaluation was fabricated in the manner described below. First, the obtained, refined carbon material was heated and dried in a vacuum at 200° C. at 0.1 torr for 2 to 4 hours, thus producing a carbon sample. Carbon black available as Denka Black from Denki Kagaku Kogyo Co., Ltd., Japan, was prepared as an electrical conduction auxiliary agent. The carbon sample, the carbon black, and PTFE binder 6J available from Mitsui-DuPont Fluorochemicals Co., Ltd., Japan were metered out at a weight ratio of 10:0.5:0.25. The materials were carefully mixed up and kneaded in a mortar. The mixture was rolled by a hot roller and finished into a sheet having a thickness t=0.25 to 0.4 mm. Then, the sheet was molded into a disk having a diameter of 20 mm by a puncher.

Two electrodes molded as described above and a third sheet electrode of the same type having a thickness t=0.2 mm and made of activated carbon were taken as one set. Two sets of electrodes were fabricated for each of three samples to which 0 g of Co, 0.5 g of Co, and 1.5 g of Co were respectively added. As a result, 18 electrodes were fabricated. A dedicated aluminum board was provided with 18 countersinks. The 18 electrodes were placed into these 18 countersinks, respectively. The thickness and weight of each electrode were measured and recorded, together with the number given to the countersink.

An aluminum disk on which two sets and three kinds of carbon electrodes were placed was put into an aluminum bat. The electrodes were processed at 250° C. at $5\times10^{-5}$ torr for 2 to 4 hours together with a separator GA-100 of glass fiber of 1 μm in a vacuum heating furnace and set within a glove box. The glove box was mounted in a vacuum impregnation tank together with a Japanese paper separator. The inside was evacuated to a vacuum. The cock at a solution introduction port was opened. An electrolyte solution was dried sufficiently by making it coexist with active alumina. The electrolyte solution consisted of a propylene carbonate solution (available as Sollight from Mitsubishi Chemical Corporation, Japan) of $Et_4N.BF_4$ having a concentration of 1.0 mol/L. Then, the solution was taken in. The states of the electrodes were observed through the view window. The vacuum pumping was continued when bubbles were being produced from the electrodes and separator. After well impregnating the electrolyte solution into the samples, they were taken out of the tank. Each sample was sandwiched between collector electrodes of aluminum foil which were previously prepared and whose surfaces were roughened. In this way, a three-electrode cell was assembled. The cell was grasped by a jig, inserted into a poly bag, and vacuum packed, thus fabricating a capacitor to be evaluated.

A transparent poly laminated bag was used to permit one to observe the internal state. It is known that the results of charge-discharge tests, especially results of long-term tests, are affected by the kind of packing material used for vacuum packing. Therefore, to evaluate the long-term performance, it is desirable to use a poly laminated bag having aluminum foil therein to prevent penetration of water. This will greatly enhance the performance of long-term life tests.

2-2) Charge-Discharge Characteristic Tests

The charge-discharge characteristics were evaluated by charging the capacitor with a constant current and monitoring that the voltage rose as electric charge accumulated in the capacitor. Specifically, when the capacitor was charged with a constant current of 10 mA or 5 mA and the voltage developed between the positive and negative electrodes reached a preset value of 3.75 V, for example, the voltage was maintained. Thus, a constant voltage-charging mode was established. Then, the current began to attenuate. When a preset charging time T (normally, 4500 seconds) elapsed, the polarity was switched and the capacitor was discharged at a constant current of 10 or 5 mA in a constant-current mode. This operation was continued until the voltage reached 0 V. Then, a pause time (normally of 180 seconds) was introduced. The aforementioned charging and discharging process with a constant current was repeated. This charging and discharging cycle was repeated a specified number of times. In this way, measurements were performed. For the measurements, a dedicated charge-discharge tester CDT-5RZ-4 available from Power Systems Corporation capable of processing four channels simultaneously was used. Only typical values of the obtained results are listed in Table 2. In this table, the notational system for "carbon species & processing conditions" is the same as in the case of Table 1.

Experimental Example 2

Instead of the carbon materials used in Experimental Example 1, 2.5 g of commercially available phenolic resin-based, KOH-activated carbon MPS-20 (produced by Kansai Coke and Chemicals Co., Ltd., Japan) was used. Three samples each of which comprised 2.5 g of the activated carbon and to which 0.5 g of metal Co, 1.5 g of metal Co, and 0 g of metal Co (no addition) were added, respectively, were prepared, in the same way as in Experimental Example 1. Thus, refined carbon materials were derived.

The amount of active oxy-hydrogens (short and moderate relaxation time components) in each obtained, refined carbon material was measured by pulsed NMR, in the same way as in Experimental Example 1. Also, capacitors were assembled using the refined carbon materials as materials for activating carbon. Their charge-discharge characteristics were evaluated. The obtained results are shown in FIG. 8 and in Tables 1 and 2.

Experimental Example 3

Instead of the carbon materials used in Experimental Example 1, three kinds of refined carbon material to which 0.5 g of metal Co, 1.5 g of metal Co, and 0 g of metal Co (no addition) were added, respectively, were prepared using different carbon species of nonporous carbon B, in the same way as in Experimental Example 1. The amounts of active oxy-hydrogens (short and moderate relaxation time components) in each obtained, refined carbon material were measured by pulsed NMR in the same way as in Experimental Example 1. Furthermore, capacitors were assembled using the obtained, refined carbon materials as materials for acti-

TABLE 2

| carbon species & processing conditions | applied voltage, V | capacitance F/cc | internal resistance, $\Omega$ | efficiency % | electrolyte | remark | Experimental Example |
|---|---|---|---|---|---|---|---|
| A + 504H | $3.75_7$ | 34.8 | 6.9 | 44.9 | ACN/EC | | 1 |
| | 3.0 | 31.2 | 6.1 | 76.2 | ACN/EC | | |
| A + Co + 504H | 3.75 | 32.4 | 5.2 | 45.5 | ACN/EC | | |
| | 3.0 | 32.1 | 3.3 | 79.8 | ACN/EC | | |
| A + 3Co + 504H | 3.75 | 34.2 | 6.3 | 40.0 | ACN/EC | | |
| | 3.0 | 33.5 | 5.9 | 68.8 | ACN/EC | | |
| A + 504H | 3.75 | 33.1 | 14.7 | 47.5 | PC | | 4 |
| | $3.5_{17}$ | 30.9 | 7.7 | 79.4 | PC | | |
| A + Fe + 504H | $3.75_2$ | 37.3 | 12.7 | 49.0 | PC | | |
| | $3.5_{17}$ | 34.4 | 6.6 | 84.4 | PC | | |
| A + 3Fe + 504H | $3.75_2$ | 38.2 | 11.4 | 46.5 | PC | | |
| | $3.0_{17}$ | 34.9 | 7.2 | 72.1 | PC | | |
| A + 504H | $3.75_2$ | 38.8 | 12.6 | 49.8 | PC | | 5 |
| | $3.0_{17}$ | 33.9 | 6.9 | 82.7 | PC | | |
| A + Ni + 504H | $3.75_2$ | 35.7 | 16.2 | 46.2 | PC | | |
| | $3.0_{17}$ | 32.3 | 8.9 | 72.9 | PC | | |
| A + 3Ni + 504H | $3.75_2$ | 35.1 | 15.2 | 50.5 | PC | | |
| | 3.5 | 34.0 | 11.1 | 65.7 | PC | | |
| A + 304H | $3.75_2$ | 34.1 | 19.3 | 51.4 | PC | | 6 |
| A + Co + 304H | $3.75_2$ | 41.1 | 13.1 | 52.6 | PC | | |
| A + 3Co + 304H | $3.75_2$ | 35.6 | 11.2 | 49.9 | PC | | |
| A + 304H | $3.75_2$ | 31.4 | 14.7 | 51.3 | PC | current: 5 mA | |
| A + Co + 304H | $3.75_2$ | 34.5 | 14.6 | 45.2 | PC | current: 5 mA | |
| A + 3Co + 304H | $3.75_2$ | 37.5 | 18.5 | 50.4 | PC | current: 5 mA | |
| B + 504H | $3.75_2$ | 27.8 | 27.7 | 56.6 | PC | | 3 |
| | 3.5 | 29.0 | 15.5 | 72.8 | PC | | |
| B + Co + 504H | $3.75_2$ | 43.9 | 12.6 | 65.3 | PC | | |
| | 3.5 | 42.9 | 9.7 | 77.6 | PC | | |
| B + 3Co + 504H | $3.75_2$ | 40.2 | 11.9 | 59.6 | PC | | |
| | 3.5 | 41.0 | 10.2 | 68.0 | PC | | |
| A + NiAc + 504H | $3.75_2$ | 38.0 | 12.6 | 37.6 | EC/PC | | 7 |
| | 3.5 | 33.6 | 5.3 | 73.0 | EC/PC | | |
| A + 3NiAc + 504H | $3.75_2$ | 39.8 | 14.1 | 44.3 | EC/PC | | |
| | 3.5 | 33.3 | 8.8 | 78.4 | EC/PC | | | vating the carbons. Their charge-discharge characteristics were evaluated. The obtained results are shown in FIG. 9 and in Tables 1 and 2.

The aforementioned nonporous carbons B were prepared by preheating petroleum-based needle coke available from a different supplier (produced by Koa Oil, Japan) at 750° C. for 4 hours to produce "calcined carbon", adding 2 parts by weight of KOH to the carbon, processing the mixture at 800° C. for 4 hours to activate the carbon, then washing the mixture with water to remove alkali components, and drying the remaining material.

Experimental Example 4

Figure 10A:
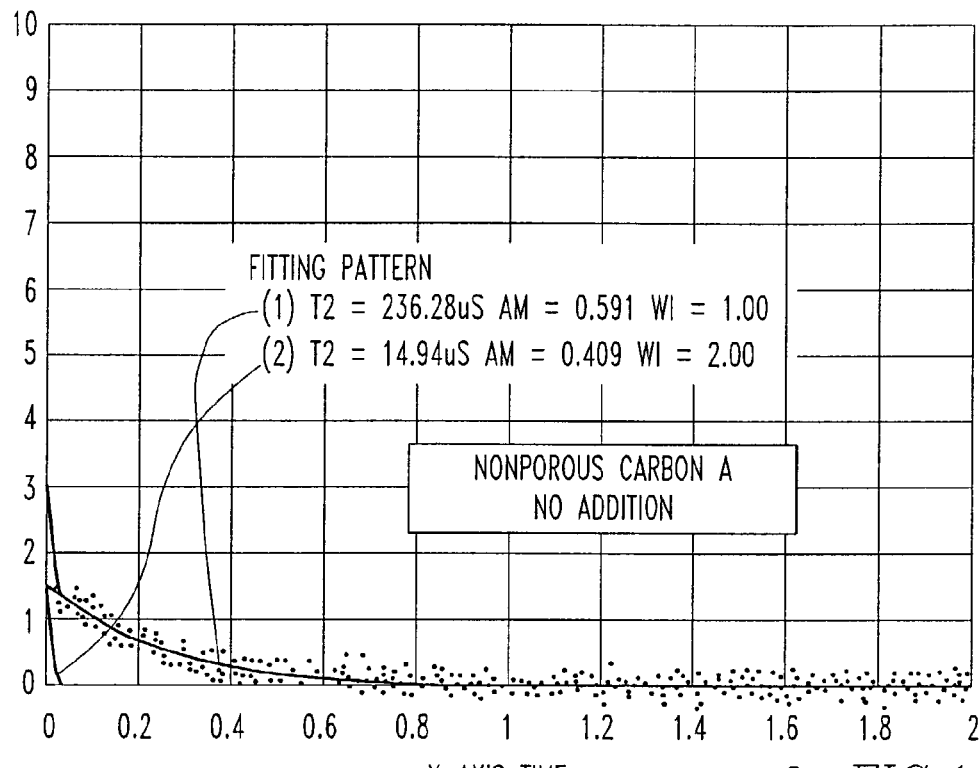
FIGS. 10(a), 10(b), and 10(c) are graphs illustrating the results of pulsed NMR measurements of refined carbon materials obtained from nonporous carbon material A by processing using Fe.
Figure 10B:
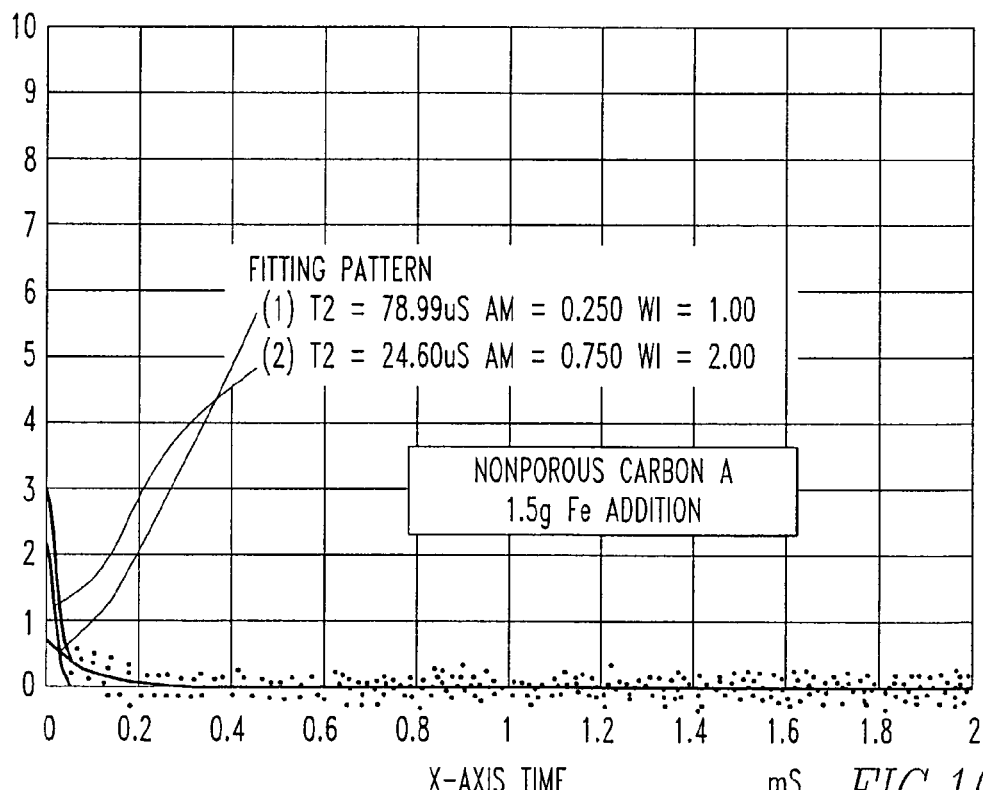
Figure 10C:
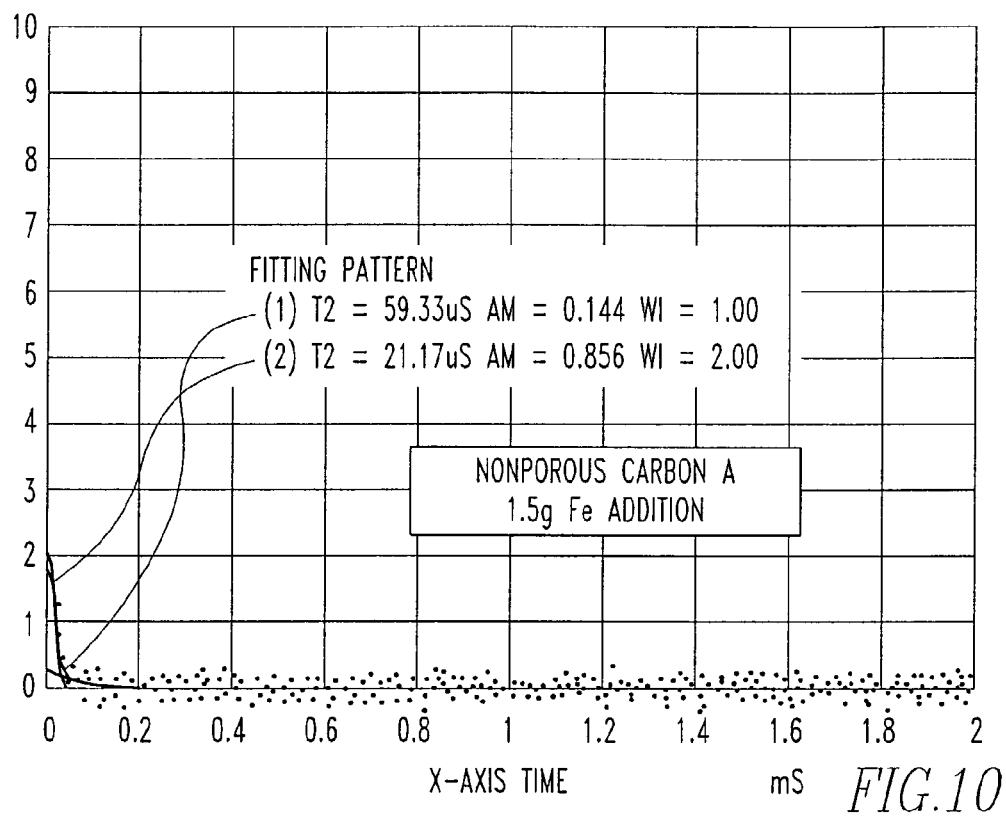

Nonporous carbon A was processed using Fe (4711 having a purity of 99.5% and 325 mesh (smaller than 13 μm), produced by Moritex Corporation, Japan) instead of the transition metal Co used in Experimental Example 1. Thus, refined carbon materials were obtained. The amounts of active oxy-hydrogens (short and moderate relaxation time components) in each obtained carbon were measured by pulsed NMR in the same way as in Experimental Example 1. Furthermore, capacitors were assembled using the obtained, refined carbon materials as materials for activating the carbons. Their charge-discharge characteristics were evaluated. The obtained results are shown in FIGS. 10(a)–10(c) and in Tables 1 and 2.

Experimental Example 5

Figure 11A:
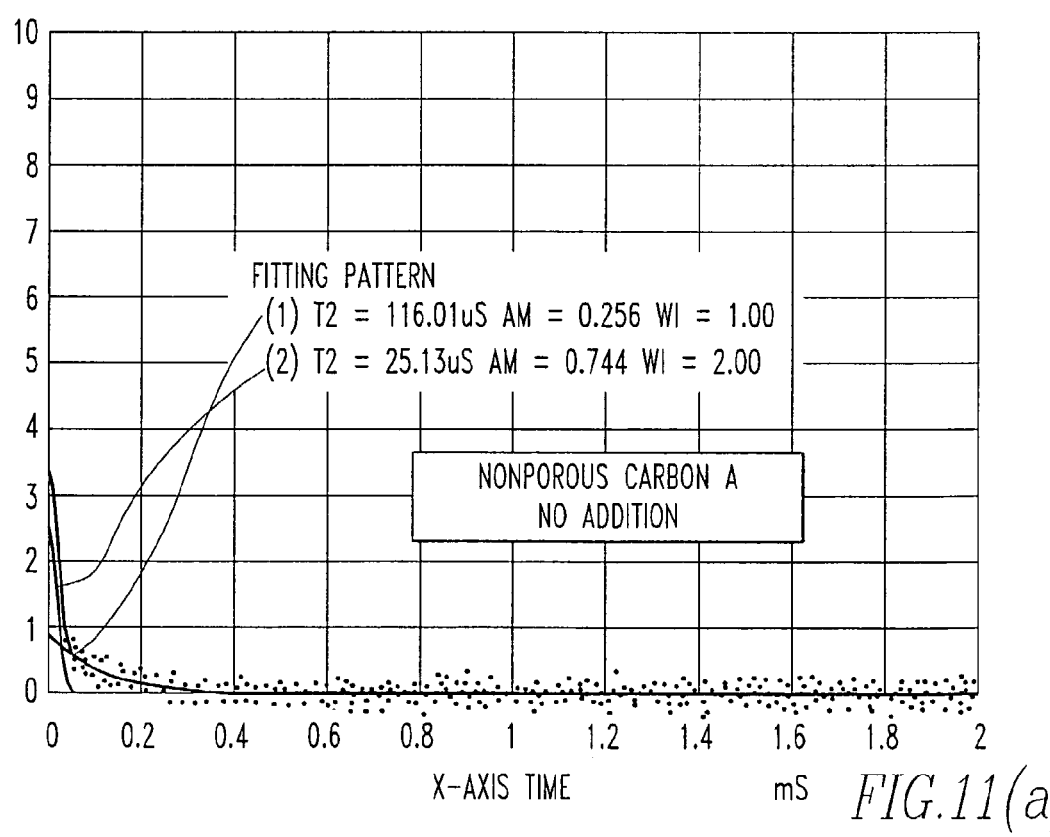
FIGS. 11(a), 11(b), and 11(c) are graphs illustrating the results of pulsed NMR measurements of refined carbon materials obtained from nonporous carbon material A by processing using Ni.
Figure 11B:
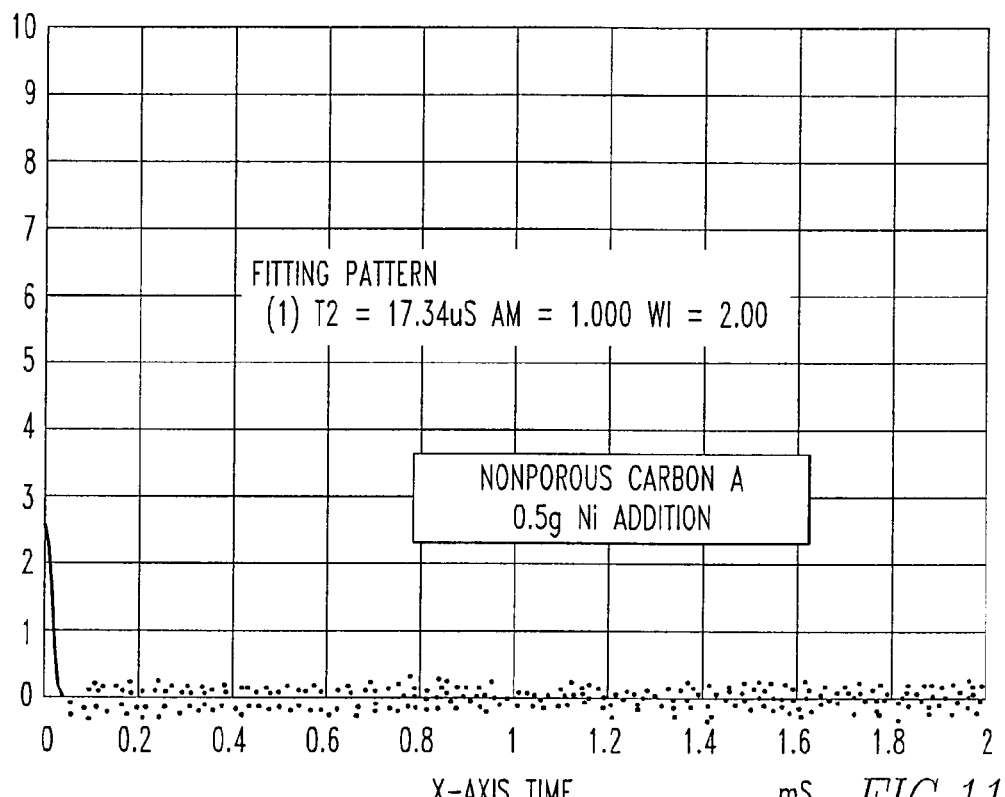
Figure 11C:
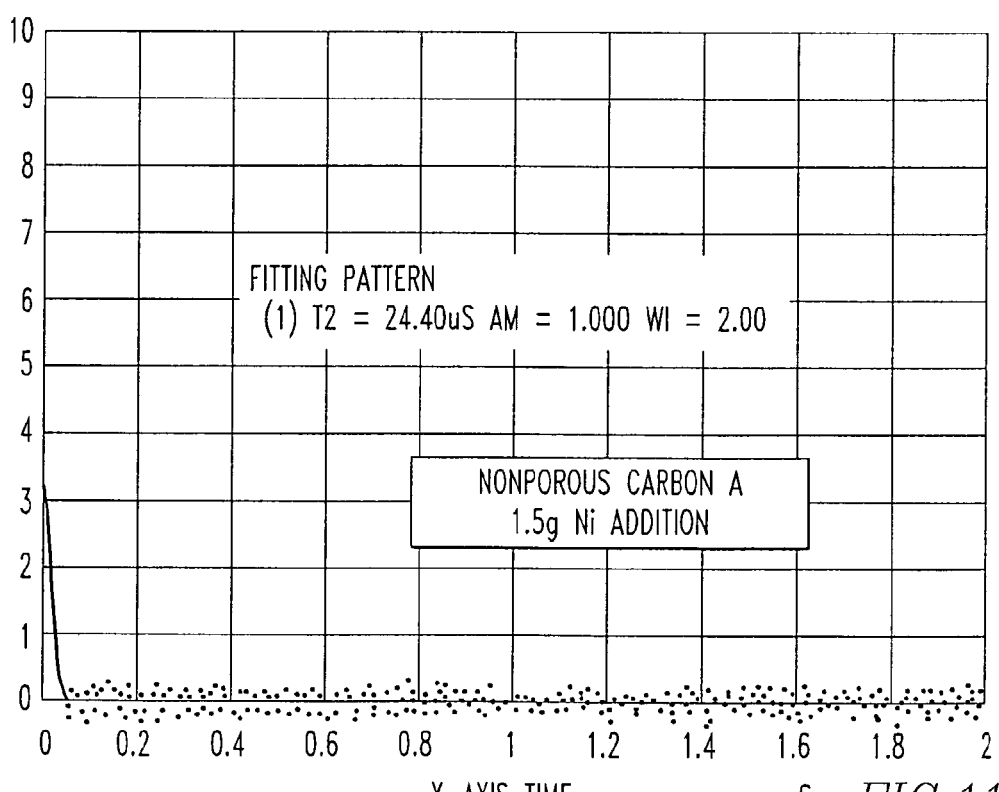

The nonporous carbon A was processed using Ni (having a purity of better than 99.0% and grain diameters of 3 to 7 μm, produced by Kanto Kagaku, Japan) instead of the transition metal Co used in Experimental Example 1. In this manner, refined carbon materials were obtained. The amounts of active oxy-hydrogens (short and moderate relaxation time components) in each obtained carbon were measured by pulsed NMR in the same way as in Experimental Example 1. Furthermore, capacitors were assembled using the obtained, refined carbon materials as materials for activating the carbons. Their charge-discharge characteristics were evaluated. The obtained results are shown in FIGS. 11(a)–11(c) and in Tables 1 and 2.

Experimental Example 6

Figure 12A:
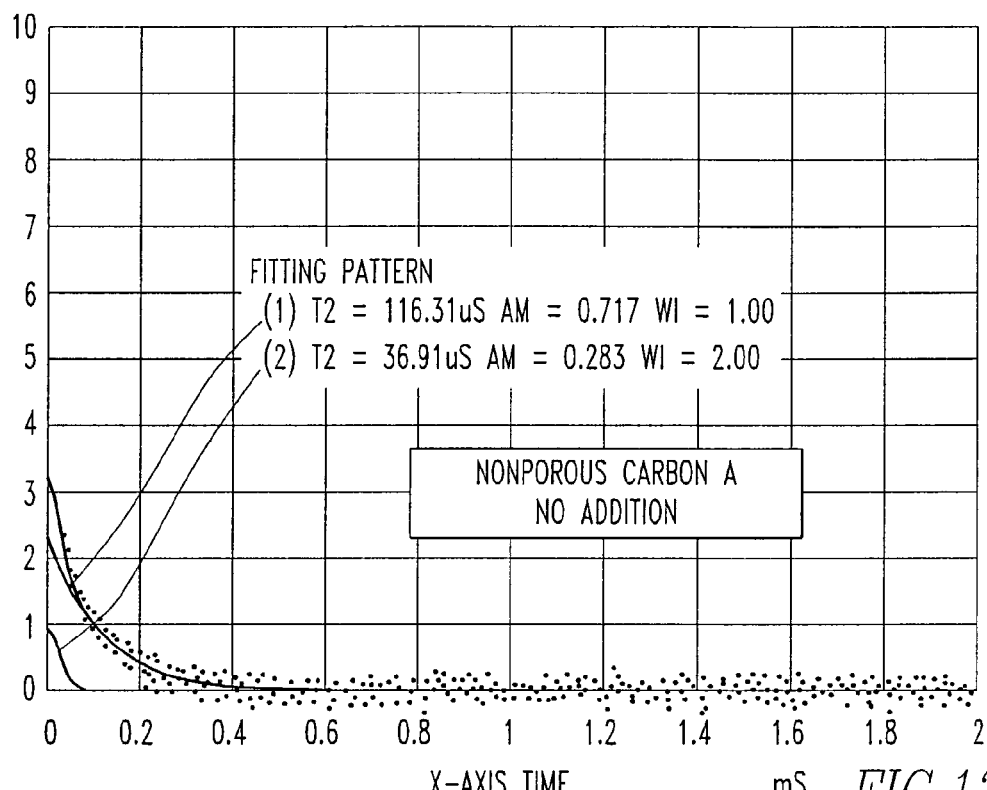
FIGS. 12(a), 12(b), and 12(c) are graphs illustrating the results of pulsed NMR measurements of refined carbon materials obtained from nonporous carbon material A by processing at a lowered temperature using Co.
Figure 12B:
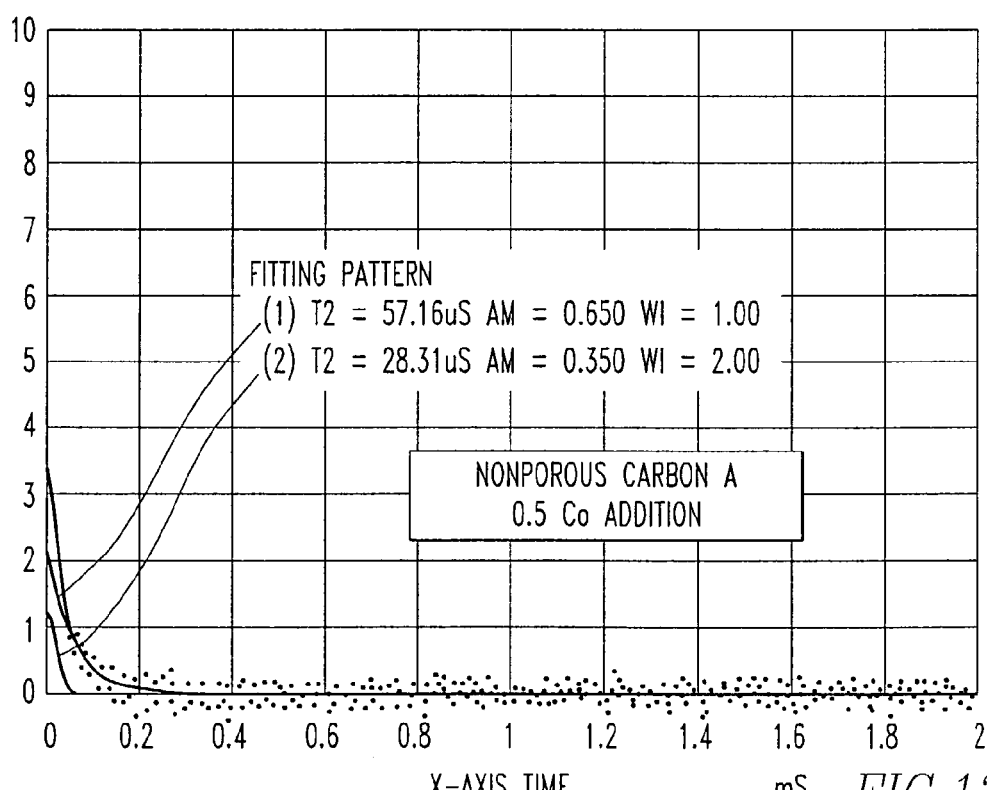
Figure 12C:
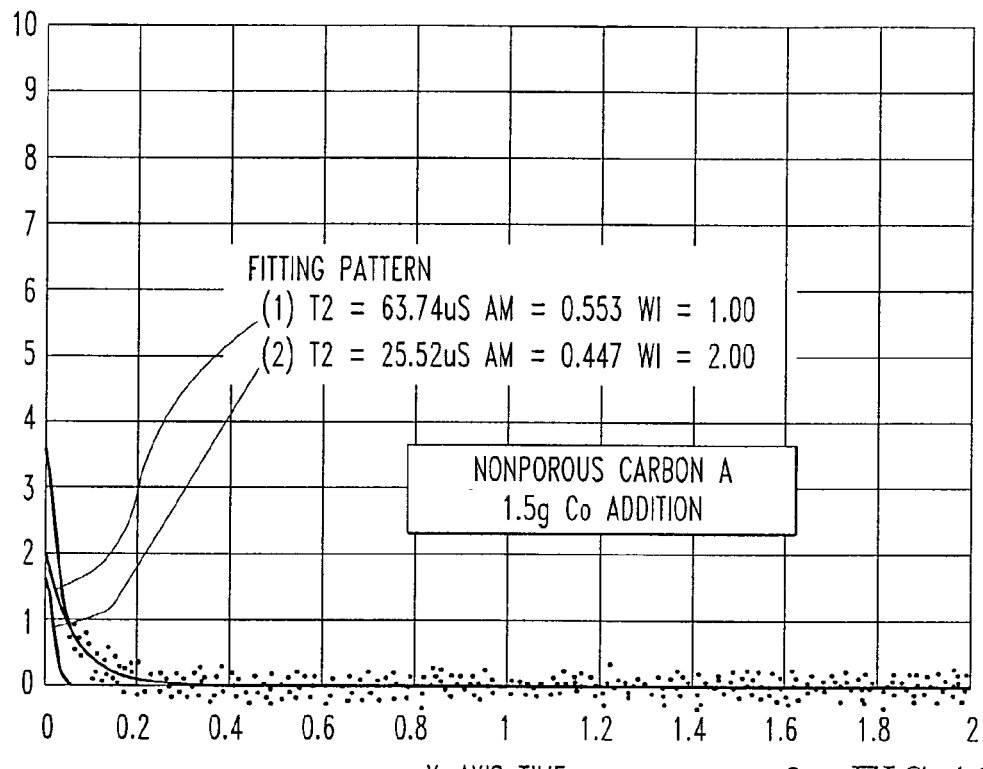

Processing was carried out similarly to Experimental Example 1 except that the processing temperature was changed to 300° C. In this way, refined carbon materials were derived. The amounts of active oxy-hydrogens (short and moderate relaxation time components) in each obtained carbon were measured by pulsed NMR in the same way as in Experimental Example 1. Furthermore, capacitors were assembled using the obtained, refined carbon materials as materials for activating the carbons. Their charge-discharge characteristics were evaluated. The obtained results are shown in FIGS. 12(a)–12(c) and in Tables 1 and 2.

Experimental Example 7

Figure 13A:
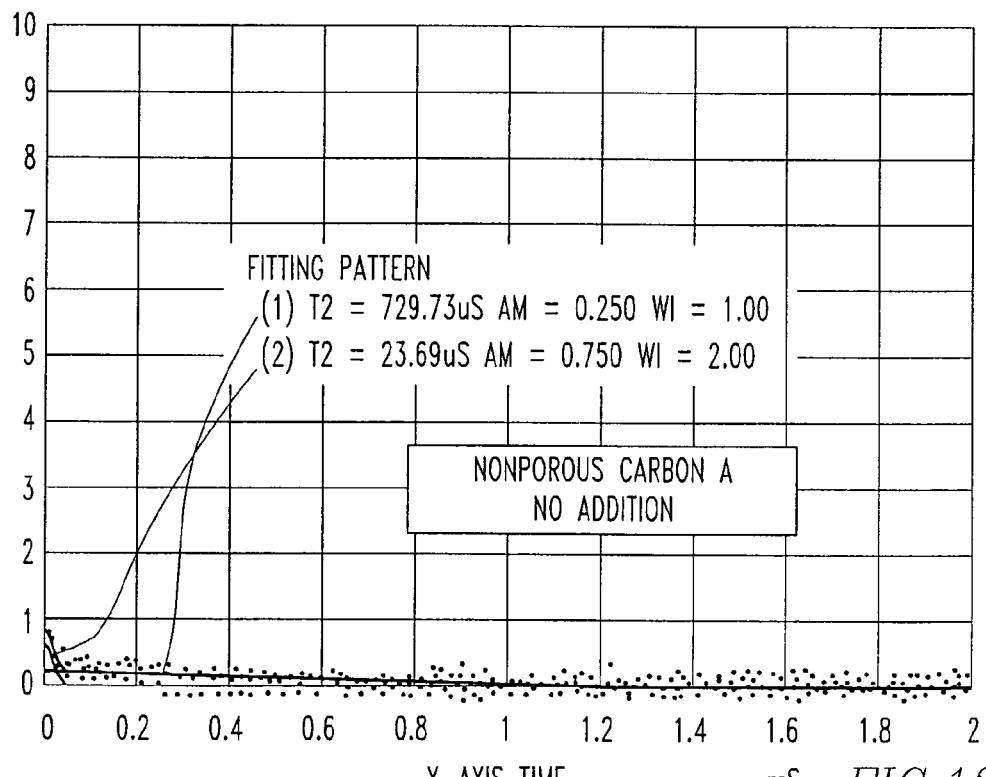
FIGS. 13(a), 13(b), and 13(c) are graphs illustrating the results of pulsed NMR measurements of refined carbon materials obtained from nonporous carbon A by processing in which nickel acetate is carried.
Figure 13B:
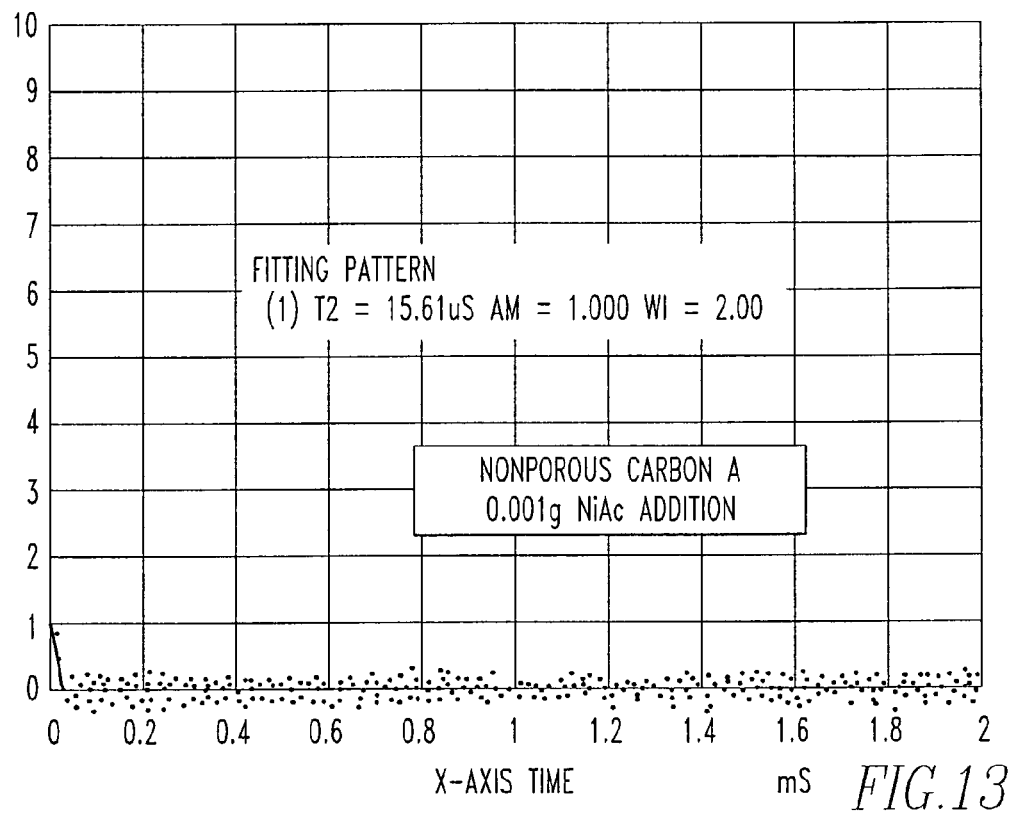
Figure 13C:
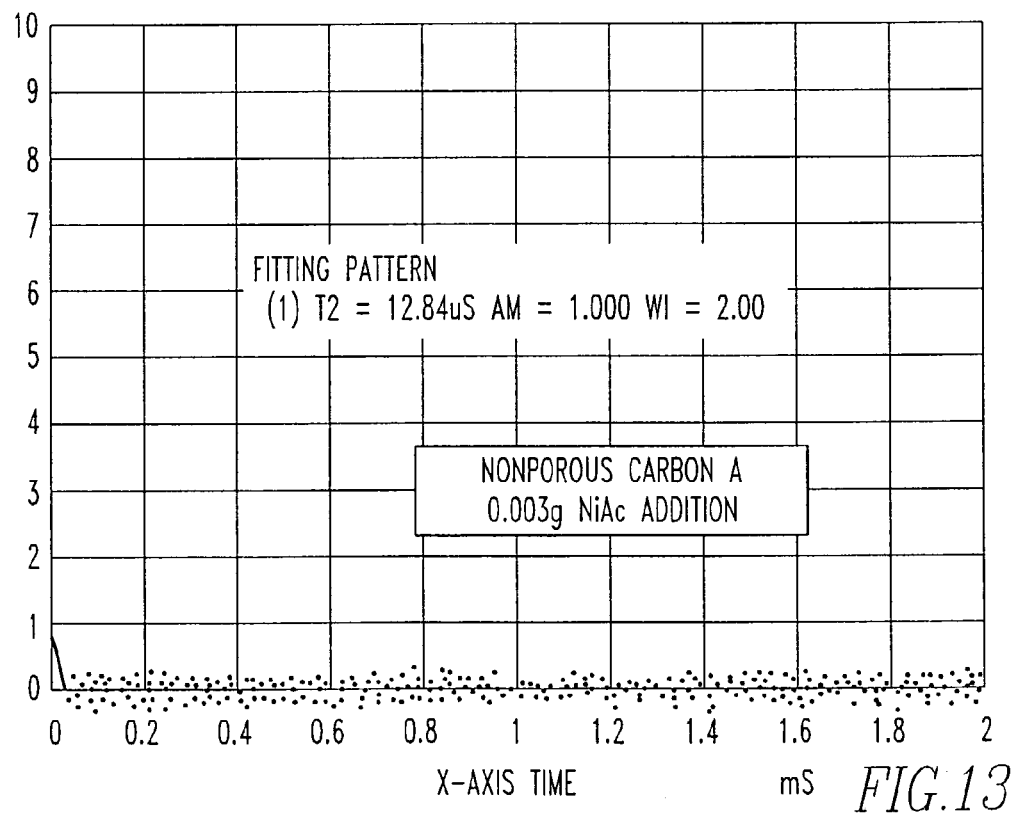

First, 3.2 g of $Ni(CH_3COO)_2.4H_2C$ (produced by Kanto Kagaku, Japan, and having a purity of 98.0%) was dissoived in 100 ml of EtOH, thus producing a nickel acetate solution. Two samples were taken from the nonporous carbon A used in Experimental Example 1. Then. 2 ml and 6 ml of the nickel acelate solution were dripped into the two samples, respectively. Each mixture was stirred well. Then, the soivent was removed in the air at 200° C. An Ni compound was carried on the carbon materials. They were ther1 thermally processed within a hydrogen stream. The amounts of nickel acetate added to the two samples were 0.015 g and 0.045 g, respectively, that are amounts converted into Ni for 3 g of carbon. Two samples holding these Ni compounds and a sample to which no Ni compound was added were processed at 500° C. for 4 hours within a hydrogen stream in the same way as in Experimental Example 1. In this way, refined carbon materials were obtained. The amounts of active oxy-hydrogens (short and moderate relaxation time components) in each obtained carbon were measured by pulsed NMR in the same way as in Experimental Example 1. Furthermore, capacitors were assembled using the obtained, refined carbon materials as materials for activating the carbons. Their charge-discharge characteristics were evaluated. The obtained results about the metals are shown in FIGS. 13(a)–13(c) and in Tables 1 and 2.

The following facts can be seen from FIGS. 6(a)–13(c) and from Table 1. FIGS. 6(a)–6(c) show the results of measurements of $^1H$ resonance of the carbon material (starting material), nonporous carbon A, activated carbon MPS-20, and nonporous carbon B used for the processing. The measurements were performed by pulsed NMR. FIG. 6(a) shows the results of measurements of nonporous carbon A. FIG. 6(b) shows the results of measurements of commercially available activated carbon MPS-20. FIG. 6(c) shows the results of measurements of nonporous carbon B. FIGS. 7(a)–7(c) show the results of measurements of $^1H$ resonance where the nonporous carbon A was processed under the presence of metal Co. FIG. 7(a) shows the results of measurements where Co was not added. FIG. 7(b) shows the results of measurements where 0.5 g of Co was added. FIG. 7(c) shows the results of measurements where 1.5 g of Co was added. It can be understood that where Co was not added, a moderate relaxation time component of a greater or lesser magnitude was observed. It has been found, on the other hand, where powder of Co was added, no moderate relaxation time component was observed at all. In every case, the ratio (m/s) of the moderate relaxation time component to the short relaxation time component decreased greatly compared with the starting carbon material. It can be seen that active oxy-hydrogens were removed effectively.

Figure 8A:
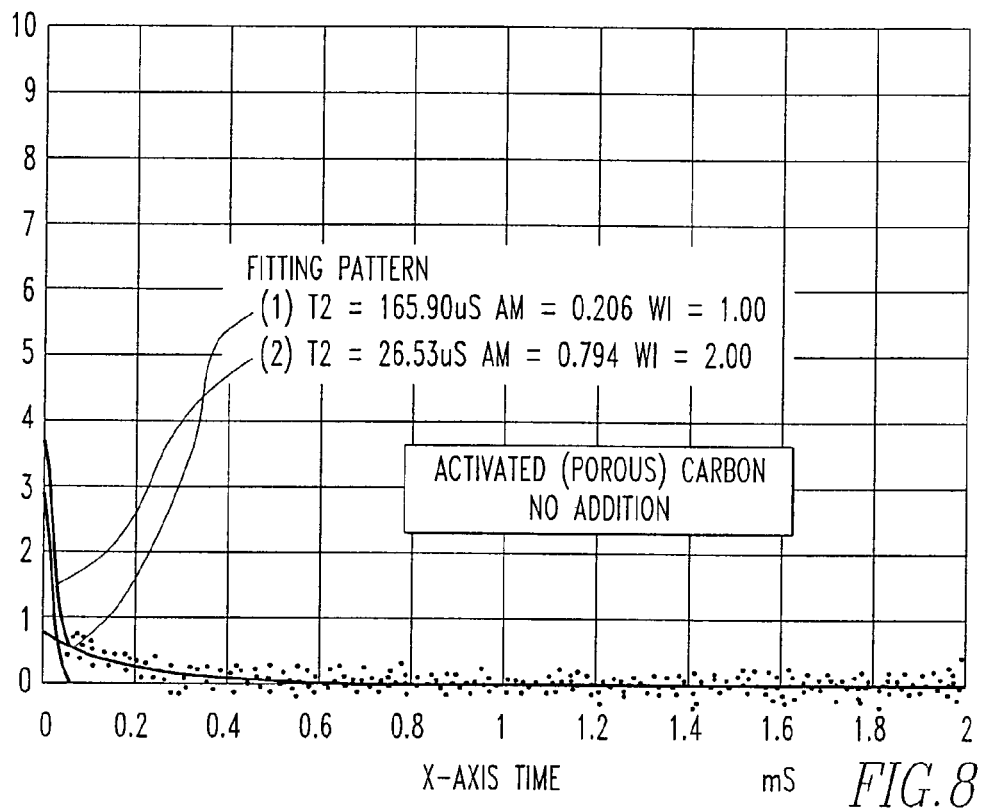
FIGS. 8(a), 8(b), and 8(c) are graphs illustrating the results of pulsed NMR measurements of refined carbon materials obtained from phenolic resin-based KOH-activated carbon MSP-20 by processing using Co.
Figure 8B:
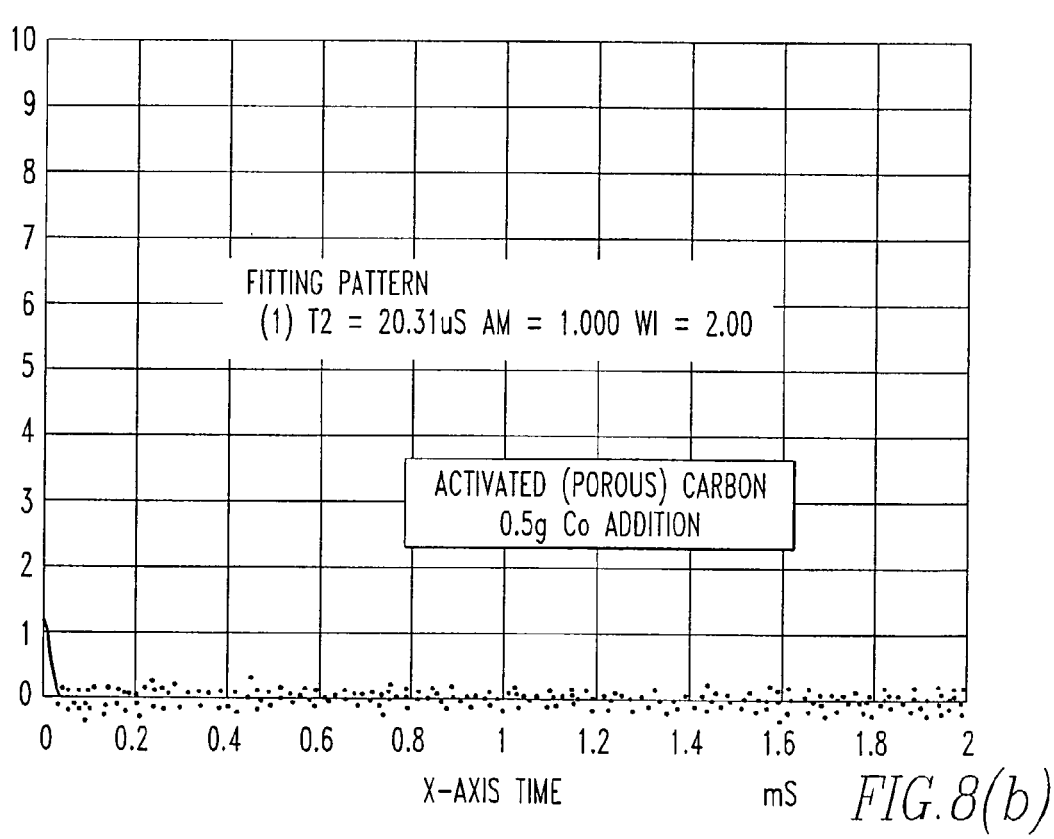
Figure 8C:
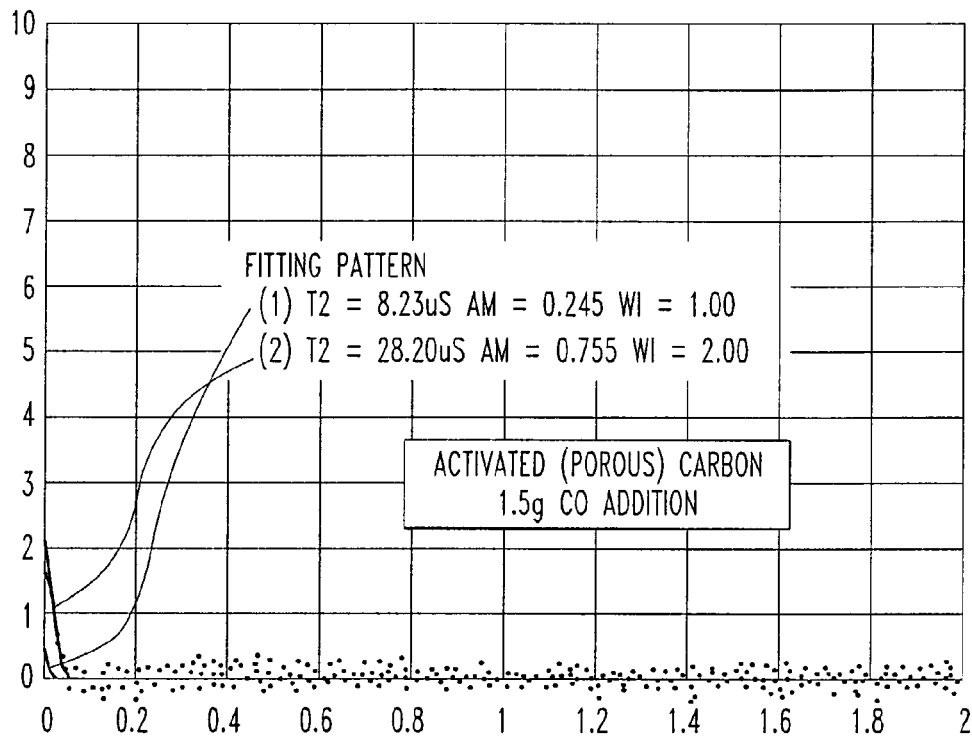
Figure 9A:
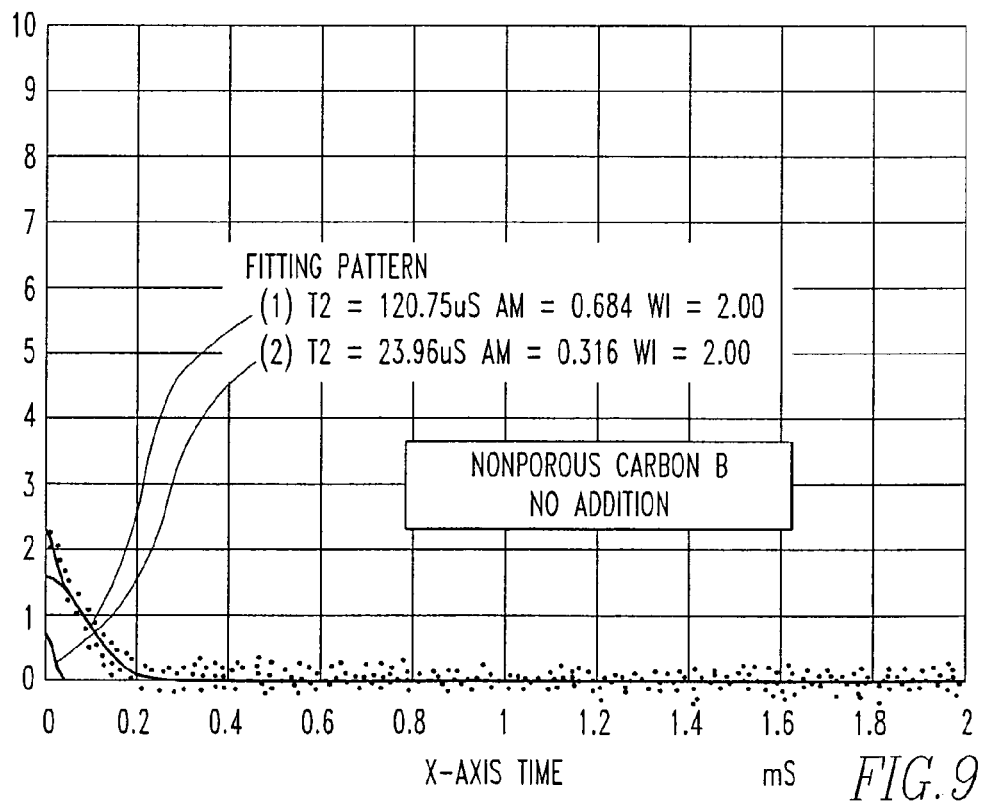
FIGS. 9(a), 9(b), and 9(c) are graphs illustrating the results of pulsed NMR measurements of refined carbon materials obtained from nonporous carbon material B by processing using Co.
Figure 9B:
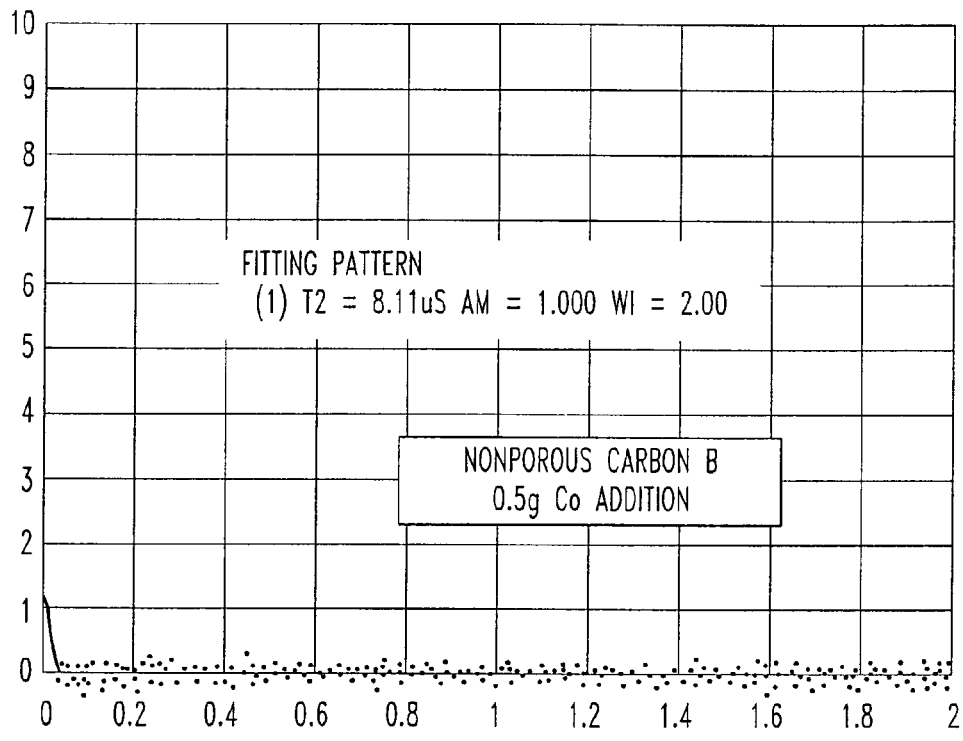
Figure 9C:
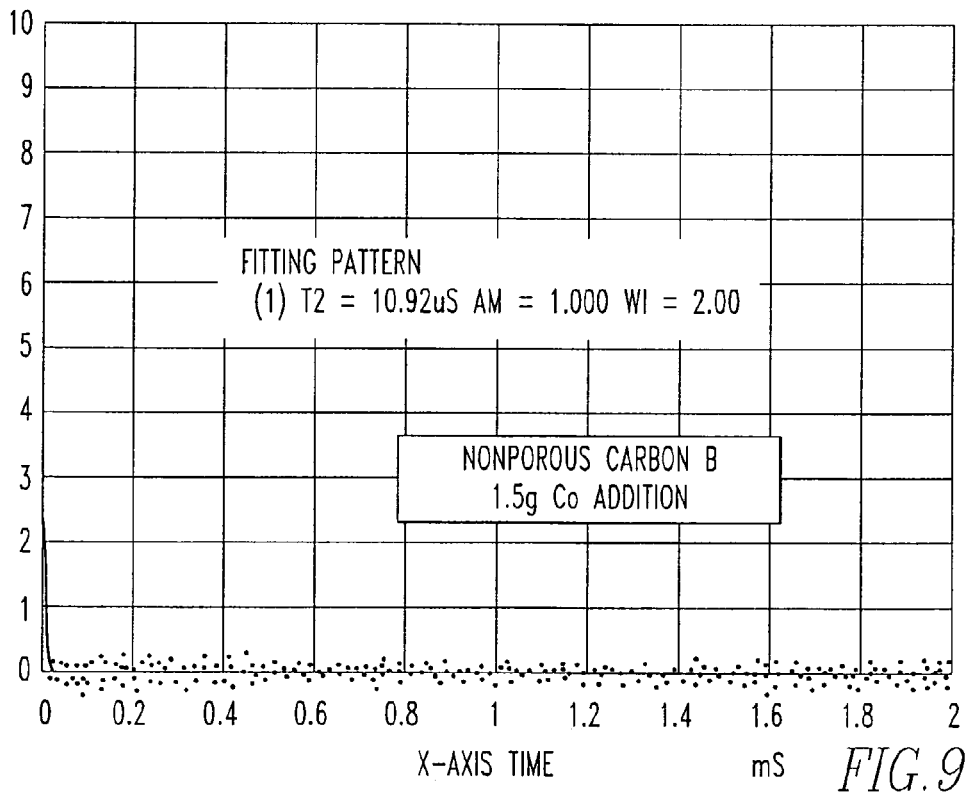

Similarly, FIGS. 8(a)–8(c) and FIGS. 9(a)–(c) show cases where the carbon material was replaced by activated carbon MSP-20 and nonporous carbon B, respectively, and processed. FIG. 8(a) and FIG. 9(a) show the results of measurements of samples to which Co was not added. FIG. 8(b) and FIG. 9(b) show the results of measurements of samples to which 0.5 g of Co was added. FIG. 8(c) and FIG. 9(c) show the results of measurements of samples to which 1.5 g of Co was added. Irrespective of the species of carbon, a moderate relaxation time component of a greater or lesser magnitude was observed where Co was not added. On the other hand, where Co powder was added, no moderate relaxation time component was observed at all. Compared with carbon material that was a starting material, the ratio rn/s of activated carbon MSP-20 was lower from the beginning. Where Co was not added, the value did not vary if processing was performed. It can be observed that the addition of Co lowered the ratio m/s and effectively removed active oxy-hydrogens. With respect to the nonporous carbon B, where Co was not added, the ratio assumed close values but the addition of Co lowered the ratio rn/s and effectively removed active oxy-hydrogens.

Expeririients were performed using different transition metals, and the results are shown in FIGS. 10(a)–10(c) and FIGS. 11(a)–11(c), where Fe and Ni were respectively used instead of Co. FIG. 10(s) indicates the results of measurements of samples to which Fe was not added. FIG. 10(b) indicates the results of measurements of samples to which 0.5 g of Fe was added. FIG. 10(c) indicates the results of measurements of samples to which 1.5 g of Fe was added. FIG. 11(a) indicates the results of measurements of samples where Ni was not added. FIG. 11(b) indicates the results of measurements of samples where 0.5 g of Ni was added. FIG. 11(c) indicates the results of measurements of samples where 1.5 of Ni was added. These results show that where no metal was added, a moderate relaxation time component of a greater or lesser magnitude was observed. On the other hand, where Ni powder was added, no moderate relaxation time component was observed at all. Meanwhile, where powder of Fe was added, the moderate relaxation time component was observed but the magnitude was lower. The ratio of the moderate relaxation time component to the short relaxation time component was less than one third. It can be seen that active oxy-hydrogens can be effectively removed regardless of the kind of the used transition metal.

FIGS. 12(a)–12(c) show the results of measurements performed where the processing temperature was lowered to 300° C. FIG. 12(a) shows a case in which nickel acetate was not carried. FIG. 12(b) shows a case in which 0.5 g of Co was added. FIG. 12(c) shows a case in which 1.5 g of Co was added. It can be seen also in this case that where Co powder was added, the moderate relaxation time component was reduced greatly compared with the case where Co was not aided. However, in order to use the material as a material for activating polarizable electrodes in an electrical double-layer capacitor, the moderate relaxation time component tends to be somewhat excessive. The processing time needs to be increased somewhat in order to reduce the moderate relaxation time component. In any case, active oxy-hydrogens can be removed.

FIGS. 13(a)–13(c) show the results of measurements performed where nickel acetate was carried on nonporous carbon A and processing was carried out. FIG. 13(a) shows a case in which nickel acetate was not carried. FIG. 13(b) shows a case in which 0.001 g of nickel acetate, which is a value converted into Ni, was carried. FIG. 13(c) shows a case in which 0.003 g of nickel acetate, which is a value converted into Ni, was carried. Anions of an organic acid, such as ions of acetic acid, were used as anions of a nickel salt for the following reason. These anions are more easily dissolvable in organic solvents than anions of inorganic acids, such as sulfuric acid, chloric acid, and nitric acid. Furthermore, these anions can be easily thermally decomposed by high-temperature processing and volatilized. We value these features highly. In this case, too, no moderate relaxation time component was observed at all where nickel acetate was carried. In this case, active oxy-hydrogens were removed even if the amount of the used transition metal, as converted into the amount of Ni, is approximately one-third of the value obtained when powder of a transition metal was used (Experimental Example 5). Therefore, it can be understood that where a carbon material and a transition metal compound are mixed, the method of carrying the transition metal compound on the carbon material is quite effective in removing active oxy-hydrogens.

The results of measurements described thus far are summarized in Table 1. It can be seen from Table 1 that where a transition metal is used, processing performed at 500° C. for 4 hours almost completely removes active oxy-hydrogens originating from hetero element-containing functional groups within a carbon material, although the activity is somewhat lower in the case of Fe. Also, in the case of Fe, the ratio of the moderate relaxation time constant to the short relaxation time constant is one third and so can be used as a material for activating carbon used in polarizable electrodes in an electrical double-layer capacitor or the like. Where the processing temperature is low, active oxy-hydrogens tend to be removed to a lesser extent.

Table 2 illustrates the results about charge-discharge characteristics. It can be seen that the capacitance of a sample, under stable state, to which a metal is added is equal to or greater than that of a sample to which no metal is added, irrespective of the kind of metal used. Furthermore, the internal resistance of a sample to which a metal is added tends to be equal or lower.

An electrical double-layer capacitor fabricated from a carbon material processed at a low temperature of 300° C. produces a small amount of air bubbles during charging and discharging. This does not hinder using an electrical double-layer capacitor in practical situations, because it is considered that the absolute amount of active oxy-hydrogens originating from actually existing hetero element-containing functional groups is quite small, though the ratio of the moderate relaxation time component to the short relaxation time component is high.

With respect to the sample carrying nickel acetate, only those components which can be removed by a magnet by the dry method are removed. The results of charge-discharge tests are indicated in Table 2. As can be seen from this table, no change was observed at all after a short-term use. Where the electrical double-layer capacitor was used in practice, no problems took place.

In Table 2, the subscripts in the "applied voltage" column indicate the number of cycles of adopted data. Where no current value is put in the "remark" column, results of execution of charging and discharging cycles at 10 mA are shown.

Figure 14:
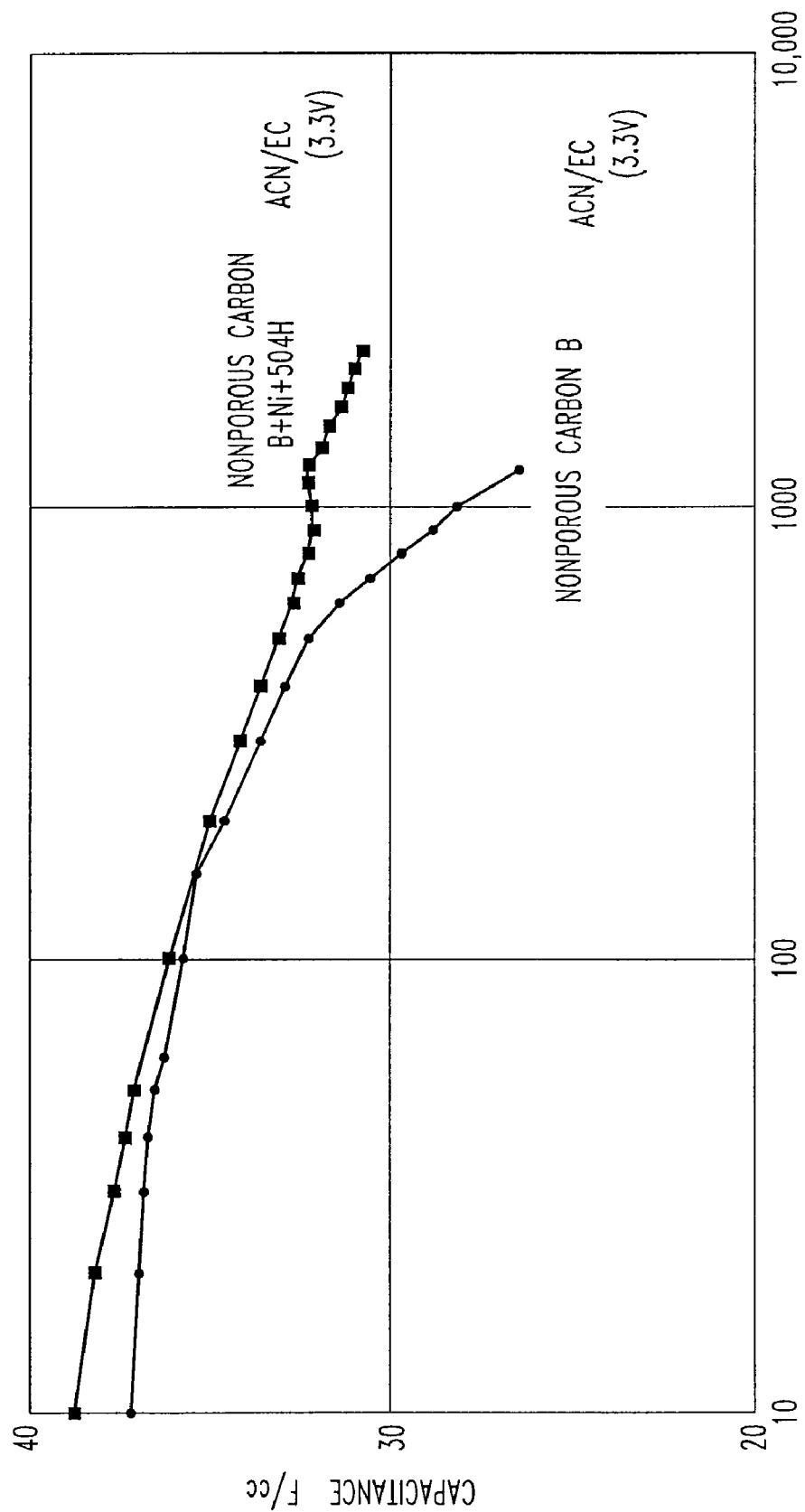
FIG. 14 is a graph illustrating variations in capacitances of capacitors during repeated charging and discharge cycles.

In the present invention, whether active oxy-hydrogens within a carbon material are present or not creates a great noticeable difference after a long-term use, i.e., when the charging and discharging cycle is repeated. Some examples are shown in FIG. 14, which is a graph showing variations of the capacitances of electrical double-layer capacitors when a charge-discharge cycle is repeated. In each cycle, each capacitor is charged up to 3.3 V at 10 mA and then discharged. One of the capacitors is fabricated using nonporous carbon B. The other capacitor is fabricated using refined nonporous carbon (B+Ni+504H) processed using Ni. It can be seen from the graph of FIG. 14 that the capacitance of the capacitor using the unprocessed nonporous carbon B decreases greatly and thus the characteristics deteriorate when the number of charge-discharge cycles exceeds about 500 times.

Meanwhile, it has been experimentally found that where fine particles of metals, such as Fe, Ni, and Co or their compounds, are processed at high temperatures, decompose, and deposit metals, a so-called spillover effect is produced. This effect occurs in the region of an activated carbon catalyst when a metal, such as a transition metal element (e.g., Co, Ni, Fe, Cu, Mo, Cr, Mn, or Th), or its sulfide is used together with a carrier consisting of carbon. Molecular $H_2$ in gaseous phase irreversibly dissociates at a metal interface into hydrogen atoms and flow out onto carbon (see, for example, Iwanami Physics and Chemistry Dictionary "Spillover" (in Japanese); "*Activated Carbon, Fundamentals and Applications, New Edition*" (in Japanese), edited by Yuzoh Sanada et al., p. 162 (1995); K. Fujimoto, S. Toyoshi, Proceeding of the 7th International Congress on Catalysis Tokyo, p. 235 (1980)). With respect to spillover effects, catalytic actions are known, but the effects on the surface structure of carbon itself is not understood. In this connection, the present invention reveals variations in surface structure of carbon by pulsed NMR analysis, including spillover effects, thus producing meaningful results. Experimental examples are considered below regarding the spillover effects.

Spillover means that hydrogen molecules on the surface of a transition metal "spill over" from a dissociation active point at which the hydrogen molecules change into active hydrogen atoms. Accordingly, for the same weight of transition metal powder, if the transition metal is more dispersed, or if the grain diameter is reduced, more active points are produced, and the spread of spillover on the carbon can be narrowed. As a result, the carbon is supplied with high-concentration active hydrogen atoms from nearby active points. The active hydrogen is bonded with carbon, thus producing "hydrogen directly bonded to carbon skeleton", the hydrogen being represented by the amount of the short relaxation time component defined herein.

According to this theory, atomic dispersion should be most effective. In fact, it can be seen that where a transition metal compound is dissolved in a solution and dispersed while carrying it on a carbon material, removal of active oxy-hydrogens can be accomplished with a less amount of transition metal than where fine powder of transition metal is mixed and dispersed.

Accordingly, we have found that where active oxy-hydrogens are removed according to the present invention, the amount of transition metal used can be reduced by dispersing the transition metal as finely and uniformly as possible when a carbon material and the transition metal are mixed. It can be estimated from this fact that transition metals used in the Experimental Examples of the present invention are affected more by the grain diameters of the transition metals rather than by the activity of the transition metals themselves.

Figure 1:
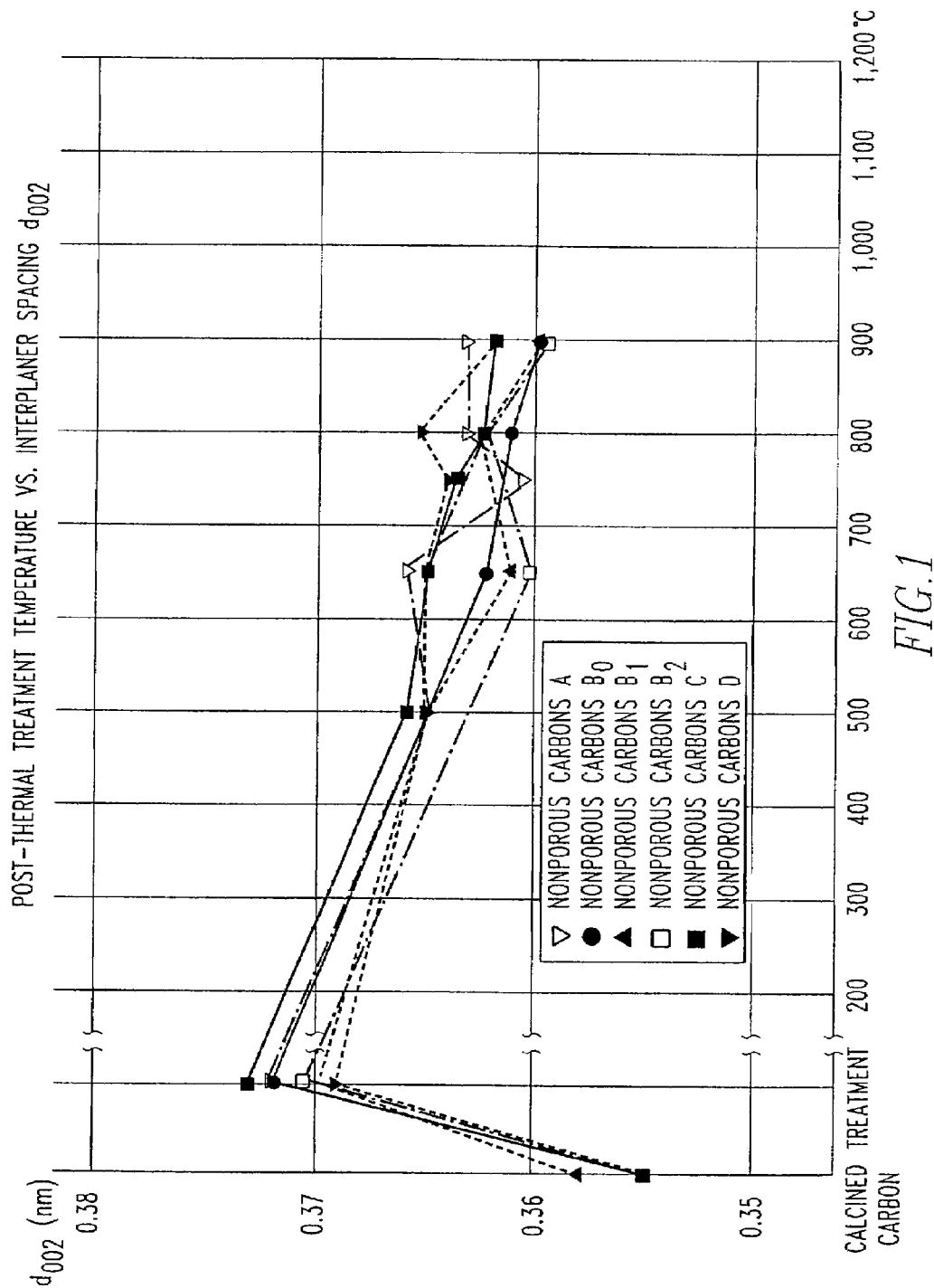
FIG. 1 is a graph illustrating variations of interplanar spacing $d_{002}$ of various kinds of nonporous carbons caused by post-thermal processing.
Figure 2:
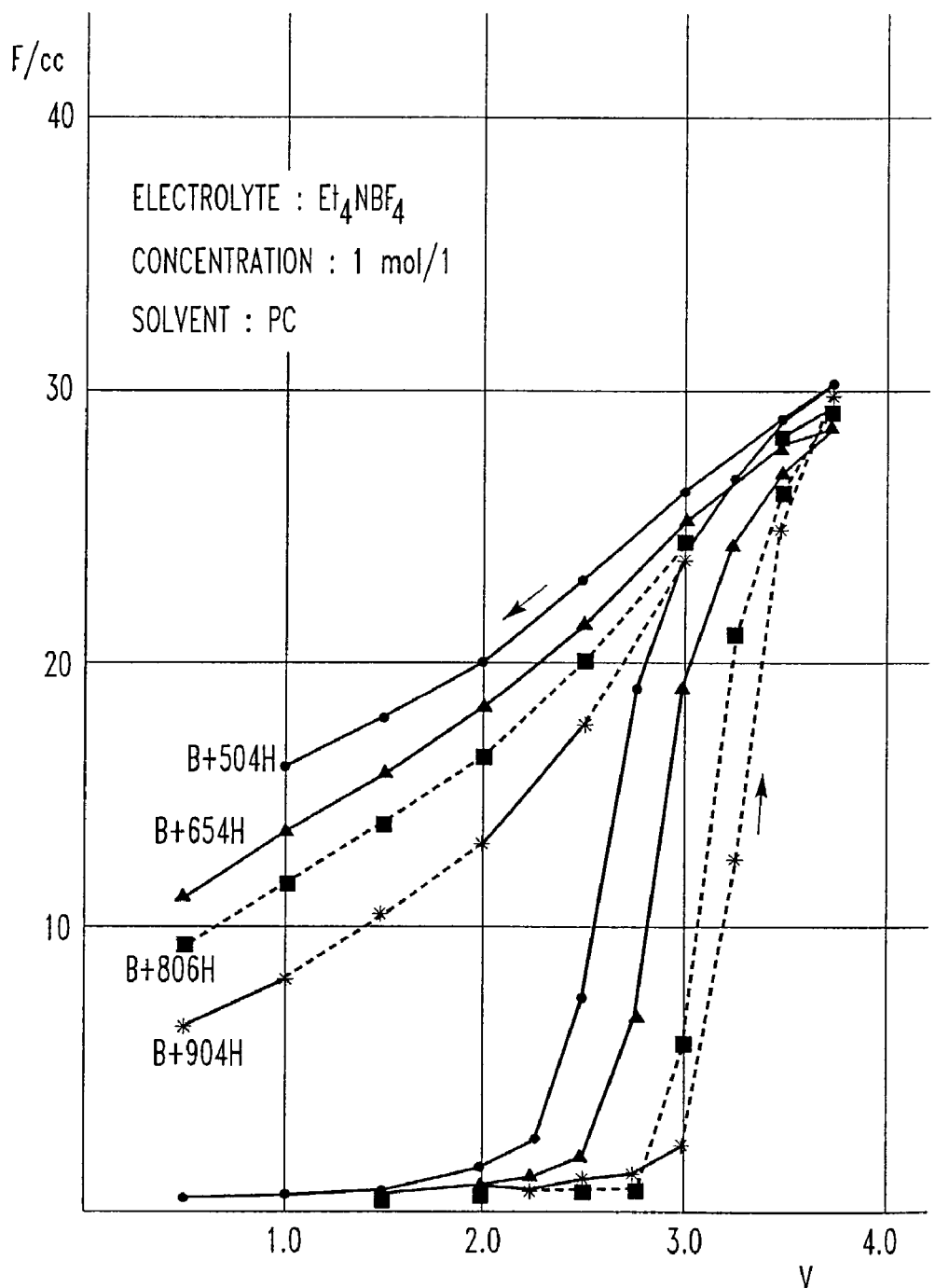
FIG. 2 is a graph showing initial charging characteristics of nonporous carbons when the thermal treatment temperature is varied.
Figure 15A:
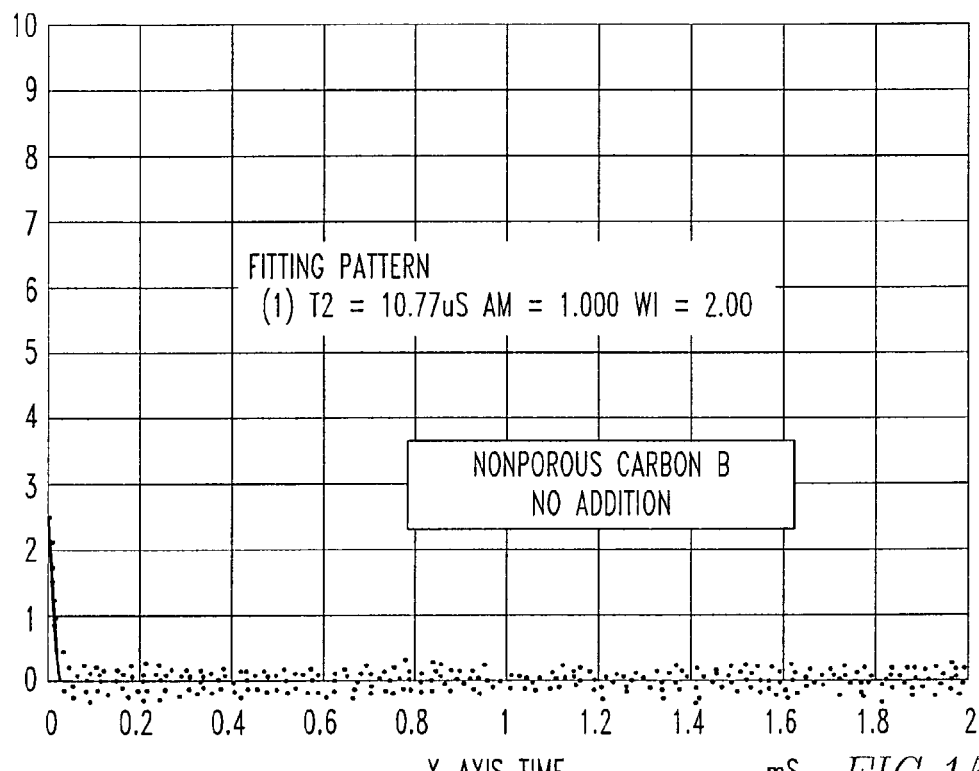
FIGS. 15(a), 15(b), and 15(c) are graphs illustrating the results of pulsed NMR experiments of refined carbon materials obtained from nonporous carbon B.
Figure 15B:
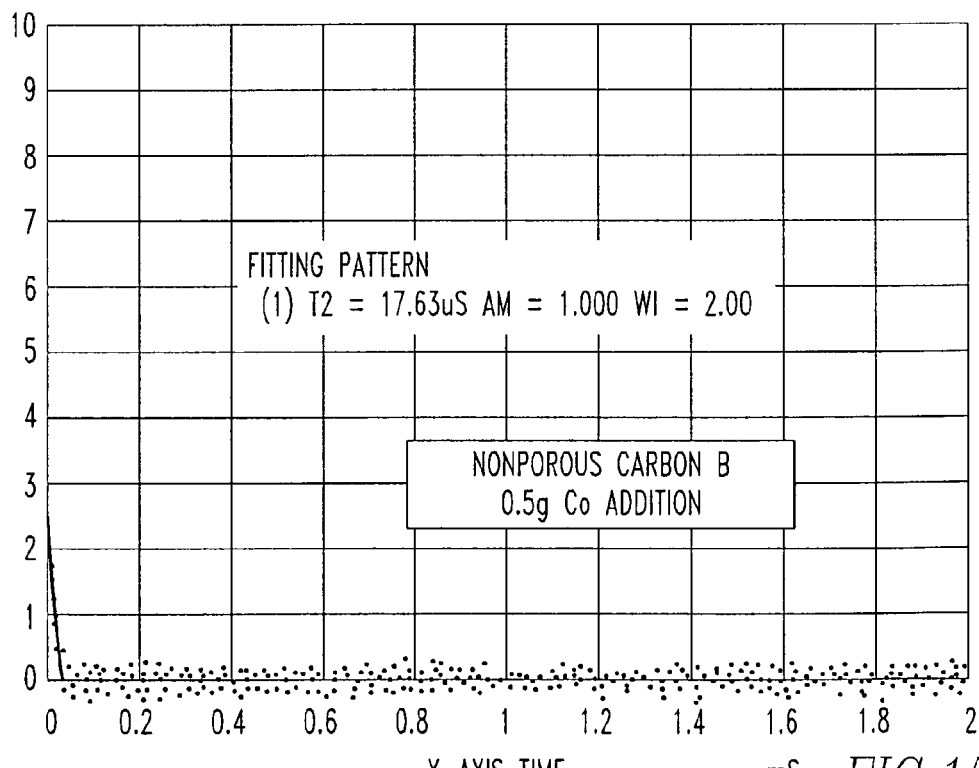
Figure 15C:
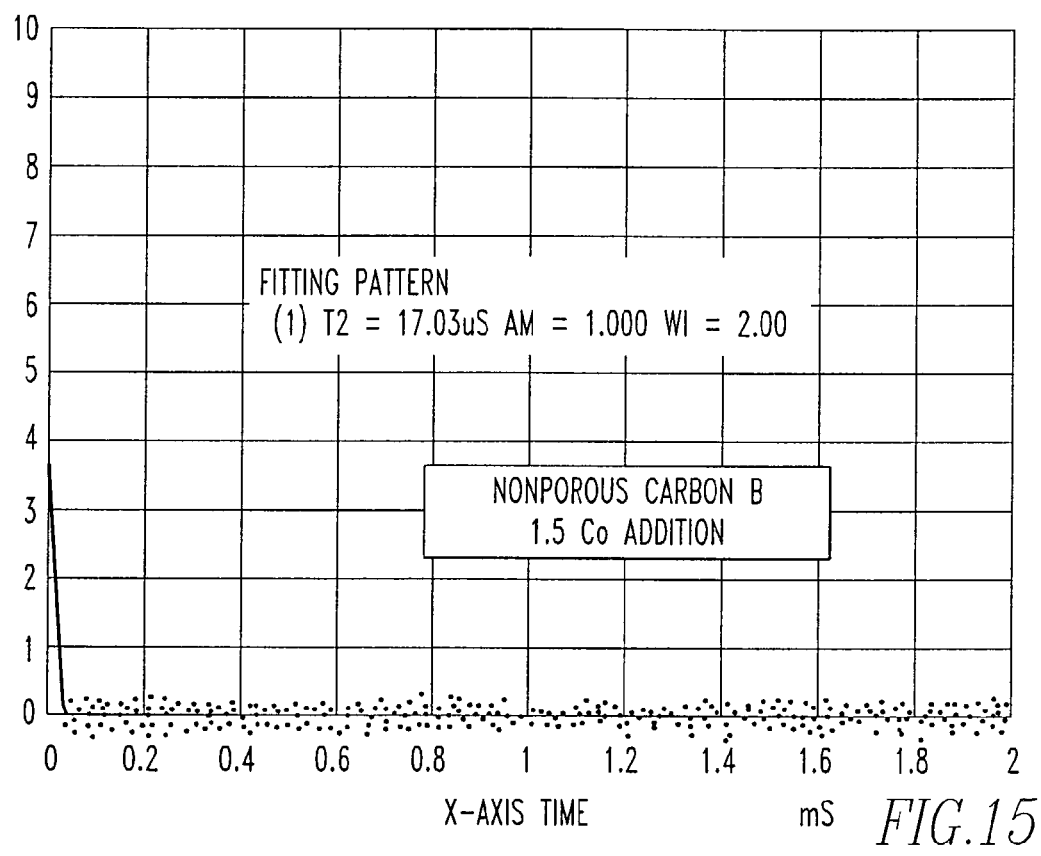

With respect to the spillover effects, where a container including steel, such as SUS304, is used during activation of carbon with KOH, the KOH attacks the container at a high temperature of 800° C. Fe dissolves out and is left in the carbon. This has been confirmed by removing alkali components after processing using KOH and detecting a peak indicative of Fe (body-centered cubic) from dried carbon powder by XRD measurement. In the case of this type of carbon, removal of active oxy-hydrogens owing to spillover effects is observed in carbons to which no metal powder is added. FIGS. 15(a)–15(c) illustrate an example of this phenomenon. Nonporous carbon B was processed as a carbon material at 500° C. for 4 hours within a hydrogen gas stream. It can be seen from FIG. 15(a) that even if Co was not added, no moderate relaxation time component was observed and active oxy-hydrogens were removed by the action of added Fe. In FIG. 15(b), 0.5 g of Co was added. In FIG. 15(c), 1.5 g of Co was added. Also, in these two cases, no moderate relaxation time components were observed, as a matter of course.

With respect to the Fe left in the carbon, a capacitor was assembled using an electrolyte solution. A charge-discharge test was repeatedly performed. Then, the carbon electrode was taken out, and an XRD measurement was performed. It was found that a peak indicating Fe (body-centered cubic) observed prior to use disappeared. This is not desirable, because it is considered that some reaction occurred within the electrolyte solution.

It remains to be elucidated what reactions do metals remaining in carbon produce and what effects are produced. However, the effects of transition metals left in the carbon material must be taken into consideration in removing active oxy-hydrogens.

If one recognizes that carbon itself is quite stable against acids and alkalis, it can be said that an electrical double layer is durable in itself. It is considered that such metals left in carbon cannot be desirable in this meaning. Hence, if metals are used as catalysts, it is desired to remove the metals from the carbon material completely.

As can be seen from the description given thus far, the present invention facilitates removing active oxy-hydrogens originating from hetero element-containing functional groups (e.g., COOH, CHO, and OH). Consequently, a carbon-activating material is obtained which is adapted as a material for polarizable electrodes typically used in an electrical double-layer capacitor. The electrical double-layer capacitor fabricated using this carbon-activating material has excellent cycle stability and aging stability. That is, neither gas production nor increase of the internal resistance occurs even if charging and discharging are repeated during use.

Having thus described my invention with the detail and particularity required by the Patent Laws, what is desired protected by Letters Patent is set forth in the following claims.

The invention claimed is:

1. A method of removing residual active oxy-hydrogens from carbon material, comprising the steps of:
   mixing said carbon material and at least one of a transition metal and a transition metal compound to thereby produce a mixture;
   thermally processing the obtained mixture within a stream of a reducing gas, thereby removing active oxy-hydrogens present in said carbon material; and
   removing the transition metal and/or transition metal compound from said thermally processed mixture.

2. A method of removing residual active oxy-hydrogens as set forth in claim 1, wherein said carbon material is one of activated carbon, porous carbon, and nonporous carbon, and wherein said carbon material from which the residual activated carbon oxides have been removed is used as a carbon-activating material for use in a polarizable electrode.

3. A method of removing residual active oxy-hydrogens as set forth in claim 1, wherein said reducing gas is either hydrogen or the mixture gas $3H_2+N_2$ obtained by catalytically decomposing ammonia.

4. A method of removing residual active oxy-hydrogens as set forth in claim 1, wherein said one of a transition metal and a transition metal compound is a transition metal mixed with a fine powder of said carbon material, and wherein said transition metal mixed with said fine powder of said carbon material assumes any one of finely powdered form, mesh product made of thin wire, dendritic product, and floccular product.

5. A method of removing residual active oxy-hydrogens as set forth in claim 4, wherein said transition metal is selected from the group consisting of Fe, Ni, Co, Cu, Mo, Cr, Mn, and Th, compounds of at least two of these metals, and alloys including one of Fe, Ni, Co, Cu, Mo, Cr, Mn, and Th.

6. A method of removing residual active oxy-hydrogens as set forth in claim 1, wherein said one of a transition metal and a transition metal compound is a transition metal, and wherein said carbon material and said transition metal compound are mixed by carrying said transition metal compound on said carbon material.

7. A method of removing residual active oxy-hydrogens as set forth in claim 1, wherein said one of a transition metal and a transition metal compound is a transition metal compound, and wherein said transition metal compound is one of an inorganic compound and an organic salt capable of being thermally decomposed into a metal.

8. A method of removing residual active oxy-hydrogens as set forth in claim 1, wherein:
(A) said one of a transition metal and a transition metal compound is a transition metal;
(B) said transition metal is selected from the group consisting of Fe, Ni, and Co, compounds of at least two of these metals, and alloys including one of Fe, Ni, and Co; and
(C) said transition metal is removed from said thermally processed mixture by a magnetic force.

9. A method of removing residual active oxy-hydrogens as set forth in claim 1 wherein said one of said transition metal and transition metal compound is removed from said thermally processed mixture according to a difference in density with said carbon material.

10. A method of removing residual active oxy-hydrogens as set forth in claim 1, wherein said step of thermally processing the obtained mixture is carried out at a temperature of between 200° C. and 850° C.

11. A method of producing a refined carbon material, comprising the steps of:
mixing a carbon material and one of a transition metal and a transition metal compound to thereby produce a mixture;
thermally processing the obtained mixture within a stream of a reducing gas; and
removing one of the transition metal and transition metal compound from the thermally processed mixture, thereby obtaining a refined carbon material from which active oxy-hydrogens have been removed.

* * * * *